(12) United States Patent  
Kawakami et al.

(10) Patent No.: US 7,495,841 B2  
(45) Date of Patent: Feb. 24, 2009

(54) ZOOM LENS AND PROJECTOR USING ZOOM LENS

(75) Inventors: Etsuro Kawakami, Akishima (JP); Yasuyuki Tejima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/880,662

(22) Filed: Jul. 24, 2007

(65) Prior Publication Data

US 2008/0024877 A1  Jan. 31, 2008

(30) Foreign Application Priority Data

Jul. 31, 2006  (JP)  .............................. 2006-207388

(51) Int. Cl.
*G02B 15/14* (2006.01)
(52) U.S. Cl. .................. 359/686; 359/687; 359/688
(58) Field of Classification Search ................. 359/676, 359/683, 686–688
See application file for complete search history.

(56) References Cited

U.S. PATENT DOCUMENTS

| | | | |
|---|---|---|---|
| 5,550,679 | A | 8/1996 | Sugawara |
| 5,644,433 | A | 7/1997 | Ikari |
| 6,016,228 | A | 1/2000 | Uzawa |
| 6,308,011 | B1 | 10/2001 | Wachi et al. |
| 6,412,972 | B1 | 7/2002 | Pujol et al. |
| 7,149,038 | B2 * | 12/2006 | Ho et al. .................. 359/687 |
| 7,152,979 | B2 | 12/2006 | Ellis et al. |
| 2008/0019019 | A1 | 1/2008 | Kawakami et al. |

(Continued)

FOREIGN PATENT DOCUMENTS

JP   2001-188171 A   7/2001
JP   2004-271668 A   9/2004

OTHER PUBLICATIONS

Japanese Office Action dated Jun. 3, 2008 and English translation thereof issued in counterpart Japanese Appln. No. 2006-207388.

(Continued)

*Primary Examiner*—Ricky L Mack
*Assistant Examiner*—Jack Dinh
(74) *Attorney, Agent, or Firm*—Frishauf, Holtz, Goodman & Chick, P.C.

(57) ABSTRACT

To provide a high performance compact zoom lens with a small lens aperture which projects an image from a light valve such as a DMD (Digital Micromirror Device) in which an image is formed by changing reflecting directions of light on to a screen or the like in an enlarged fashion, according to the invention, there is provided zoom lens comprising, in order from a magnifying side thereof, a first lens group having a positive or negative refractive power as a whole, a second lens group having a negative refractive power as a whole, a third lens group having a positive or negative refractive power as a whole and a fourth lens group having a positive refractive power as a whole, wherein changing the magnification of the whole lens system thereof is attained by configuring such that the first lens group is left fixed while a magnification varying operation is effect, the second lens group, the third lens group and the fourth lens group are made to move on an optical axis.

20 Claims, 11 Drawing Sheets

U.S. PATENT DOCUMENTS

2008/0019020 A1    1/2008   Kawakami et al.
2008/0019021 A1    1/2008   Kawakami et al.

OTHER PUBLICATIONS

"Digital Micromirror Device" downloaded from Wikipedia, the free encyclopedia, http://en.wikipedia.org/wiki/digital_micromirror_device., downloaded Jan. 3, 2008, 2 pages.

"DMD (Digital Micro-Mirror Device)", About.com: Home Theater http://hometheater.about.com/od/televisionbasics/g/dmddef.htm?p=1, downloaded Jan. 3, 2008, 1 page.

"Thefreedictionary.com" Digital micromirror device- encyclopedia article about Digital micr . . . http://encyclopedia.thefreedictionary.com/p.Digital+micromirror+device, downloaded Jan. 3, 2008, 2 pages.

* cited by examiner (EMBODIMENT 1)

(EMBODIMENT 1: WIDE-ANGLE END)

(EMBODIMENT 1: INTERMEDIATE AREA)

(EMBODIMENT 1: TELEPHOTO END)

(EMBODIMENT 2)

(EMBODIMENT 2: WIDE-ANGLE END)

(EMBODIMENT 2: INTERMEDIATE AREA)

(EMBODIMENT 2: TELEPHOTO END)

(EMBODIMENT 3)

(EMBODIMENT 3: WIDE-ANGLE END)

(EMBODIMENT 3: INTERMEDIATE AREA)

(EMBODIMENT 3: TELEPHOTO END)

(EMBODIMENT 4)

(EMBODIMENT 4: WIDE-ANGLE END)

(EMBODIMENT 4: INTERMEDIATE AREA)

(EMBODIMENT 4: TELEPHOTO END)

(EMBODIMENT 5)

(EMBODIMENT 5: WIDE-ANGLE END)

(EMBODIMENT 5: INTERMEDIATE AREA)

(EMBODIMENT 5: TELEPHOTO END)

ZOOM LENS AND PROJECTOR USING ZOOM LENS

BACKGROUND of THE INVENTION

The present invention relates to a compact zoom lens having a small lens aperture which projects an image from a light valve such as, mainly, a DMD (Digital Micromirror Device), in which an image is formed by changing reflecting directions of light shone thereon, on to a screen or the like on an enlarged scale.

Adopting a DMD on a projector unit as a light valve is regarded as advantageous over other methods in obtaining miniaturized projector units. Currently, portable compact projector units have been broadly propagated, and among them, data projectors constitute a center of interest because of its handiness when presenting information. In projector units designed to be portable, it is critical to reduce the thickness of a projector unit, and hence, it can be said that the reduction in thickness is a most critical factor in projector units which are in many cases carried together with a note-type personal computer for use in combination therewith. As an example of a means for solving this problem, for example, the Japanese Unexamined Patent Publication No. 2004-271668 discloses a design method for making compact a projection lens.

An aspect of the invention is to provide a projector which is thin enough to be carried conveniently and which can project an enlarged image with high image quality on to a large screen even within a limited space by realizing a compact zoom lens.

SUMMARY of THE INVENTION

According to a preferred aspect of the invention, there is provided a zoom lens including, in order from a magnifying side, a first lens group having a positive or negative refractive power as a whole, a second lens group having a negative refractive power as a whole, a third lens group having a positive or negative refractive power as a whole and a fourth lens group having a positive refractive power as a whole.

In this zoom lens, changing the magnification of the whole lens system thereof is attained by configuring such that the first lens group is left fixed while a magnification varying operation is effect, the second lens group and the third lens group are made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the fourth lens group is made to move on the optical axis in such a manner as to move in a direction from the contracting side to the magnifying side over a range from the wide angle end to the telephoto end.

In addition, in this zoom lens, the following conditional expression (1) is satisfied with respect to a power set to the second lens group and the third lens group, the following conditional expression (2) is satisfied with respect to a power set to the fourth lens group, and the following conditional expression (3) is satisfied with respect to the size of an airspace on the contracting side of the fourth lens group at the wide angle end;

$$-1.1 < f_w/f_{II\text{-}III} < -0.6 \tag{1}$$

$$0.35 < f_w/f_{IV} < 0.55 \tag{2}$$

$$1.7 < d_{wIV}/f_w \tag{3}$$

where $f_w$: composite focal length of the whole lens system at the wide angle end (focused at a magnifying side object distance of 1700 mm from a lens surface of the first lens group which is situated closest to the magnifying side);

$f_{II\text{-}III}$: composite focal length of the second lens group and the third lens group at the wide angle end (focused at the magnifying side object distance of 1700 mm from the lens surface of the first lens group which is situated closest to the magnifying side);

$f_{IV}$: composite focal length of the fourth lens group;

$d_{wIV}$: airspace between the fourth lens group and a cover glass of a light valve at the wide angle end.

In addition, another aspect of the invention is to provide a projector unit having incorporated therein the zoom lens described above.

DESCRIPTION of THE PREFERRED EMBODIMENTS

Figure 1:
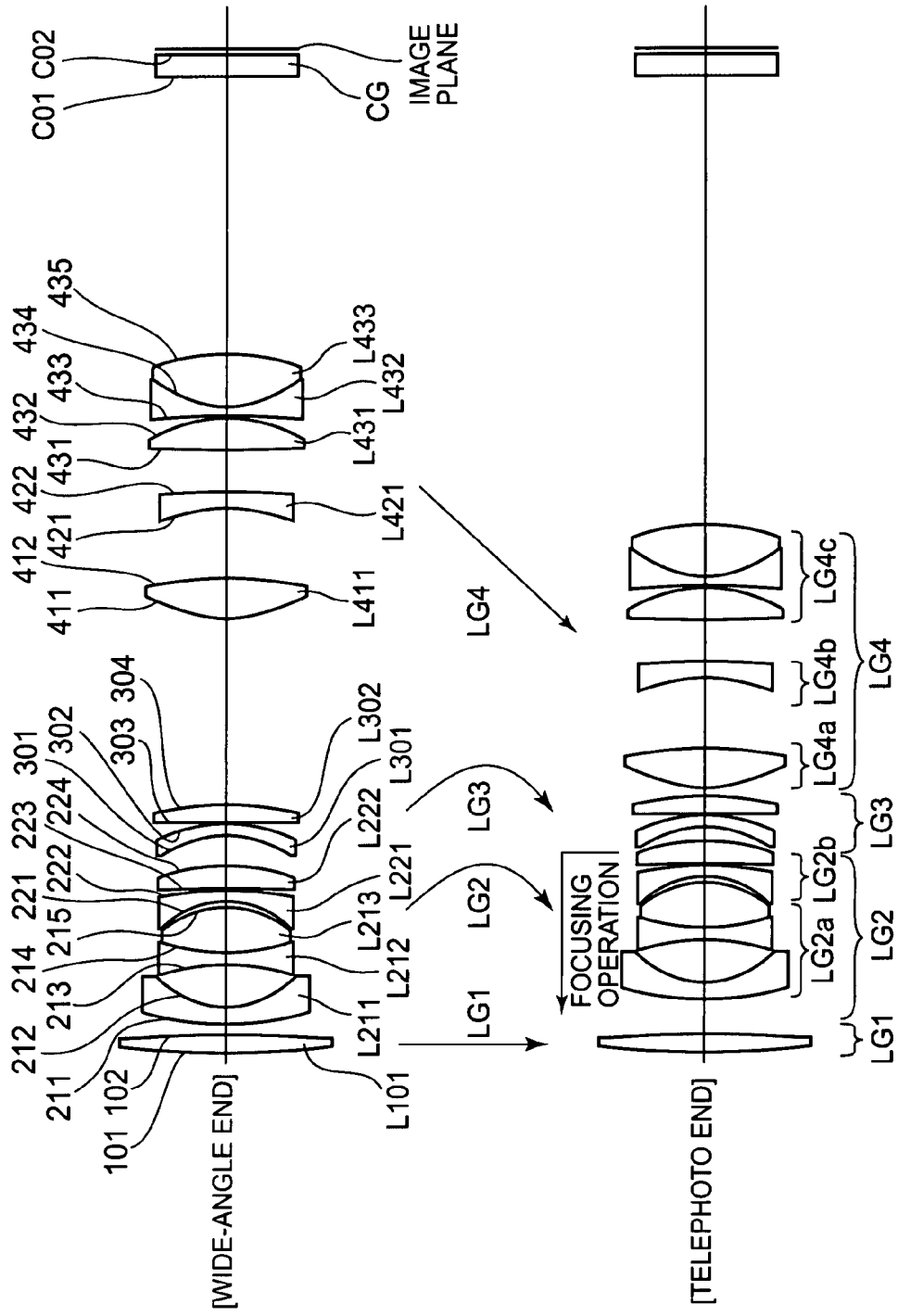
FIG. 1 is a drawing showing a lens configuration of a first embodiment of a zoom lens according to the invention.

Hereinafter, the present invention will be described based on specific numerical embodiments thereof.

In first to fifth embodiments which will be described below, a zoom lens is made up of, in order from a magnifying side thereof, a first lens group LG1 having a positive or negative refractive power as a whole, a second lens group LG2 having a negative refractive power as a whole, a third lens group LG3 having a positive or negative refractive power as a whole, and a fourth lens group LG4 having a positive refractive power as a whole.

The first lens group LG1 is made up by disposing a single lens element having a positive refractive power (hereinafter, referred to as a positive lens element) or a lens element having a negative refractive power (hereinafter, referred to as a negative lens element) (the lens element being designated as L101, a magnifying side surface being designated as 101, and a contracting side surface being designated as 102).

The second lens group LG2 is made up by disposing, in order from a magnifying side thereof, a second a lens group LG2a and a second b lens group LG2b. The second a lens group LG2a is made up by disposing, in order from a magnifying side thereof, a negative lens element (designated as L211 and having a magnifying side surface 211 and a contracting side surface 212) which is formed into a meniscus shape which is made to bulge outwards from the magnifying side to be convex, a negative lens element (designated as L212 and having a magnifying side surface 213 and a contracting side surface 214) and a positive lens element (designated as L213 and having a magnifying side surface 215 and a contracting side surface 216, but when cemented to the lens element L212, having a magnifying side surface 214 and a contracting surface 215). The second b lens group LG2b, which follows the second a lens group LG2a has a magnifying side refracting surface which is formed into a heavily concaved surface which bulges inwards towards a contracting side thereof and a contracting side refracting surface which is formed into a convex surface which bulges outwards towards the contracting side and is made up by disposing one or two lens elements (designated in order from the magnifying side as L221, L222 and having lens surfaces designated in order from the magnifying side as 221, 222 ... ).

In addition, the third lens group LG3 is made up by disposing one or two lens elements which include at least a positive lens element (designated in order from a magnifying side thereof as L301, L302, ... and having surfaces designated in order from the magnifying side as 301, 302, ... ).

Furthermore, the fourth lens group LG4 is made up by disposing, in order from a magnifying side thereof, a fourth a lens group LG4a, a fourth b lens group LG4b and a fourth c lens group LG4c. The fourth a lens group LG4a has a positive refractive power as a whole and is made up by disposing a total of one to three lens elements including at least one positive lens element (designated in order from a magnifying side thereof as L411, L412, ... and having lens surfaces designated in order from the magnifying side as 411, 412, ... ). The fourth b lens group LG4b is made up by disposing a single lens element (designated as L421 and having surfaces designated in order from the magnifying side as 421, 422). The fourth c lens group LG4c has a positive refractive power as a whole and is made up by disposing a total of three or four lens elements including at least two positive lens elements and a negative lens element (designated in order from the magnifying side as L431, L432, ... and having surfaces designated in order from the magnifying side as 431, 432, ... ).

In addition, a cover glass CG (having a magnifying side surface designated as C01 and a contracting side surface as C02), which is a constituent components of a light valve such as a DMD, is provided to the contracting side of the fourth lens group LG4 with a large airspace for disposing an illumination system provided therebetween.

The second a lens group LG2a and the second b lens group LG2b, which make up the second lens group LG2, are fixed to a movable second lens barrel, the third lens group LG3 is also fixed to a movable third lens barrel, and the fourth a lens group LG4a, the fourth b lens group LG4b and the fourth c lens group LG4c, which make up the fourth lens group LG4, are fixed to a movable fourth lens barrel. In addition, the first lens group LG1 is fixed while the focal length is being changed, the second lens group LG2 and the third lens group LG3 are made to move on an optical axis in a direction from the magnifying side towards the contracting side over a range from a wide angle end to an intermediate area and are made to move on the optical axis in a direction from the contracting side towards the magnifying side over a range from the intermediate area to a telephoto end, and the fourth lens group LG4 is made to move on the optical axis in a direction from the contracting side to the magnifying side over a range from the wide angle end to the telephoto end, whereby the variable power of a whole lens system of the zoom lens is changed.

As is known, the configuration of an aspherical surface which is used in each of the embodiments is defined by a curved surface obtained by rotating about the optical axis a curve given by the following aspherical expression with a Z axis formed in the optical axis direction and a Y axis formed in a direction which intersects the optical axis at right angles:

$$Z=(Y^2/r)/[1+\sqrt{\{1-(1+K)(Y/r)^2\}}]+A \cdot Y^4+B \cdot Y^6+C \cdot Y^8+D \cdot Y^{10}+\ldots$$

where, r: paraxial radius of curvature; K: cone constant; A, B, C, D ... : higher order aspherical coefficients.

Note that in representing the cone constant and higher order aspherical constant in tables, "E and a number following the E" represents a "power of 10". For example, "E-4" means $10^{-4}$, and a numerical value lying directly before this numeric value only has to be multiplied thereby.

Furthermore, according to the embodiments of the invention, there is provided a zoom lens including, in order from a magnifying side, a first lens group having a positive or negative refractive power as a whole, a second lens group having a negative refractive power as a whole, a third lens group having a positive or negative refractive power as a whole and a fourth lens group having a positive refractive power as a whole, wherein changing the magnification of the whole lens system thereof is attained by configuring such that the first lens group is left fixed while a magnification varying operation is effect, the second lens group and the third lens group are made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the fourth lens group is made to move on the optical axis in such a manner as to move in a direction from the contracting side to the magnifying side over a range from the wide angle end to the telephoto end.

In addition, in this zoom lens, the following conditional expression (1) is satisfied with respect to a power set to the second lens group and the third lens group, the following conditional expression (2) is satisfied with respect to a power set to the fourth lens group, and the following conditional expression (3) is satisfied with respect to the size of an airspace on the contracting side of the fourth lens group at the wide angle end;

$$-1.1 < f_w/f_{II\text{-}III} < -0.6 \qquad (1)$$

$$0.35 < f_w/f_{IV} < 0.55 \qquad (2)$$

$$1.7 < d_{wIV}/f_w \qquad (3)$$

where $f_w$: composite focal length of the whole lens system at the wide angle end (focused at a magnifying side object distance of 1700 mm from a lens surface of the first lens group which is situated closest to the magnifying side);

$f_{II\text{-}III}$: composite focal length of the second lens group and the third lens group at the wide angle end (focused at the magnifying side object distance of 1700 mm from the lens surface of the first lens group which is situated closest to the magnifying side);

$f_{IV}$: composite focal length of the fourth lens group;

$d_{wIV}$: airspace between the fourth lens group and a cover glass of a light valve at the wide angle end.

In this invention, an airspace between the second lens group and the third lens group changes only little when the focal length is changed. This is because these two lens groups are given the same function or role to play in consideration of the distribution of power of the whole system. Consequently, the conditional expression (1) represents a condition associated with an appropriate distribution of power to the second lens group and the third lens group which have the negative refractive power as a whole. Namely, this becomes a necessary condition for balancing a condition for properly correcting the size of the whole optical system and aberrations.

In addition, a space where an optical system for illuminating the light valve such as the DMD is disposed needs to be secured in an airspace portion defined between the fourth lens group and the cover glass of the light valve, and the second lens group and the third lens group also have an objective to secure the space. Because of this, in the event that a lower limit of the expression is surpassed, the resultant negative power of the second lens group and the third lens group becomes large, and in conjunction with this, the positive power of the fourth lens group has to intensified, whereby balancing the aberrations becomes difficult and the performance is deteriorated. On the contrary, in the event that an upper limit of the expression is surpassed, a large airspace has to be defined between the second lens group and third lens group and the fourth lens group, whereby the size of the whole optical system becomes large, which contradicts to the objective of the invention to miniaturize the zoom lens, or no airspace can be secured between the fourth lens group and the cover glass of the light valve.

The conditional expression (2) is associated with the fourth lens group having the strong positive power which governs the variable power of the whole lens system by moving along the optical axis direction. In the event that the positive power increases to exceed an upper limit, the moving distance of the fourth lens group in relation to the variable power can be small, but the balance with the other lens groups is collapsed, whereby the performance is decreased. On the contrary, in the event that a lower limit is surpassed, it is advantageous with respect to aberration, but the moving distance is increased, and this will do the damage to the miniaturization of the zoom lens.

In addition, the conditional expression (3) is a space condition of the fourth lens group and the cover glass of the light valve at the wide angle end. The conditional expression (3) is a condition for a so-called back focus. As has been described above, this space needs to be secured for the space for the illumination system of the light valve. Consequently, in the event that a lower limit is surpassed, the space for the illumination system becomes insufficient, which makes difficult the design of a projector unit.

Furthermore, the first lens group is made up by disposing a positive or negative lens element, and the following conditional expression (4) is preferably satisfied with respect to a power set to the first lens group:

$$|f_w/f_I|<0.3 \qquad (4)$$

where, $f_I$: composite focal length of the first lens group.

While the positive or negative power set to the first lens group which is shown by the conditional expression (4) is relatively small, the positive or negative power so set is such as to finally balance the resultant aberration of the second lens group which bears the primary power and the lens groups lying therebehind, and in the event that the first lens group has an excessive power which surpasses the power expressed by the conditional expression (4), aberrations are deteriorated due to the first lens group being made up of the single lens element.

Furthermore, the second lens group is made up by disposing, in order from a magnifying side thereof, a second a lens group and a second b lens group, the second a lens group being made up by disposing, in order from a magnifying side thereof, a negative lens element which is formed into a meniscus shape which is made to bulge outwards from the magnifying side to be convex, a negative lens element and a positive lens element, the second b lens group having a magnifying side refracting surface which is formed into a heavily concaved surface which bulges inwards towards a contracting side thereof and a contracting side refracting surface which is formed into a convex surface which bulges outwards towards the contracting side and being made up by disposing one or two lens elements, wherein the following conditional expression (5) is satisfied with respect to a power set to the second a lens group, the following conditional expression (6) is satisfied with respect to a power set to the second b lens group, and the following conditional expression (7) is satisfied with respect to a size of the second lens group to the third lens group on the optical axis:

$$-0.9<f_w/f_{IIa}<-0.3 \qquad (5)$$

$$-0.55<f_w/f_{IIb}<-0.05 \qquad (6)$$

$$1.0<T_{II-III}/f_w<2.4 \qquad (7)$$

where, $f_{IIa}$: composite focal length of the second a lens group which makes up the second lens group;

$f_{IIb}$: composite focal length of the second b lens group which makes up the second lens group;

$T_{II-III}$: a distance on the optical axis between the magnifying side surface of the lens element of the second lens group which is disposed closest to the magnifying side and the contracting side surface of the lens element of the third lens group which is disposed closest to the contracting side at the wide angle end (focused at the magnifying side object distance of 1700 mm from the lens surface of the first lens group which is situated closest to the magnifying side).

The conditional expression (5) and the conditional expression (6) are such as to secure the space where to dispose the illumination system, that is, a portion corresponding to a back focus, which is normally long, on the contracting side of the fourth lens group under the contradicting conditions of good performance and miniaturization. Namely, the second lens group must have a strong negative power, and it is good to distribute such a negative power in a way expressed by the conditional expressions (5), (6).

As the contents that are expressed by the respective conditional expressions, the conditional expression (5) relates to the negative power of the second a lens group. In order to obtain long portion for the portion which corresponds to the back focus on the contracting side of the fourth lens group, it is effective to increase, in particular, the negative power of the second a lens group, and in the event that upper and lower limits of the conditional expression (5) are surpassed, the negative power of the second b lens group or the second a lens group becomes too large, and a good performance cannot be obtained. Similarly, the conditional expression (6) relates to the negative power of the second b lens group, and in general, it is advantageous that the negative power of the second b lens group is smaller than that of the second a lens group. In the event that upper and lower limits of the conditional expression (6) are surpassed, the negative power of the second a lens group or the second b lens group becomes too large, and a good performance cannot be obtained.

The conditional expression (7), which follows the conditional expressions (5), (6), indicates an effective condition to realize the miniaturization or to decrease the aperture of, in particular, a lens element lying in the vicinity of the front lens. Rays of light that have emerged from the second lens group are largely diffused due to the strong negative power of the second lens group, and consequently, the aperture of the lens tends to be easily increased. This is prevented by increasing the thickness of the second lens group in a way expressed by the conditional expression (7). On the other hand, in order to disperse the negative power of the second lens group, the number of lens elements needs to be increased, and hence, the second lens group inevitably needs to be long to some extent on the optical axis. In the event that a lower limit is surpassed, it becomes difficult to decrease the aperture, whereas in the event that an upper limit is surpassed, a size in the direction of the optical axis becomes too large, and it becomes difficult to satisfy the specification. In addition to this, in association with the increase in the number of lens elements, the weight of the second lens group is increased, and there is no point in realizing the idea of miniaturization.

Furthermore, the following conditional expression (8) is satisfied with respect to a configuration of a contracting side surface of the most magnifying side lens element of the second a lens group, the following conditional expression (9) is satisfied with respect to a configuration of a magnifying side surface of the most magnifying side lens element of the second b lens group, the following conditional expression (10) is satisfied with respect to characteristics of the refractive index of a glass material which is used for each of the lens elements which make up the second a lens group, and the following conditional expression (11) is satisfied with respect to the dispersing characteristics of the glass material used for each of the lens elements which make up the second a lens group:

$$0.8 < f_w / r_{IIa2} < 1.4 \tag{8}$$

$$-1.45 < f_w / r_{IIb1} < 0.9 \tag{9}$$

$$1.65 < N_{IIa} \tag{10}$$

$$V_{IIaP} - V_{IIaN} < 0 \tag{11}$$

where, $r_{IIa2}$: radius of curvature of the contracting side surface of the lens element of the second a lens group which is disposed closest to the magnifying side;

$r_{IIb1}$: radius of curvature of the magnifying side surface of the lens element of the second b lens group which is disposed closest to the magnifying side;

$N_{IIa}$: mean value of the refractive indexes of the respective lens elements which make up the second a lens group relative to the d line;

$V_{IIaP}$: mean value of Abbe numbers of the respective positive lens elements which make up the second a lens group;

$V_{IIaN}$: mean value of Abbe numbers of the respective negative lens elements which make up the second a lens group.

The conditional expression (8) relates to the configuration of the contracting side surface of the lens element of the second a lens group which is disposed closest to the magnifying side and defines a configuration which is made generally concentric relative to a bundle of rays of light on the magnifying side and which basically suppresses the generation of aberrations while allowing the relevant lens group to keep the strong power. Consequently, in the event that an upper limit is surpassed, spherical aberration and coma aberration are overcorrected, whereas in the event that a lower limit is surpassed, those aberrations are corrected insufficiently or undercorrected.

The conditional expression (9) is such as to affect the spherical aberration and coma aberration in the second lens group and the effective aperture of the lens element which makes up the first lens group (that is, the aperture of the front lens element). The specification of the zoom lens of this embodiment requires that the angle of view at the wide angle end be wide while the aperture of the front lens element is designed small. Normally, these two conditions are conditions of contradicting natures. In order to decrease the aperture of the front lens element while attaining satisfied corrections of the respective aberrations, it is inevitable that a bundle of rays of light which corresponds to an image point where the height of an image becomes high needs to be passed through a position where the height of the bundle of rays of light becomes lower than in the first lens group. It is the most magnifying side lens element of the second b lens group that realizes what has just been mentioned in a remarkable way within the second lens group. Although the power given to this lens element is relatively small, the lens element attains its purpose by being formed into the meniscus configuration in which the contracting side element is made to bulge outwards largely to be convex. On the other hand, a good balance has to be maintained between realization of the small aperture of the front lens element and correction of the spherical aberration and coma aberration in the second lens group, and in the event that a lower limit is surpassed, that is, in the event that the radius of curvature becomes too small, the degree of freedom in correction of spherical aberration and coma aberration becomes insufficient, whereas in the event that an upper limit is surpassed, the aperture of the front lens element needs to be increased in order to maintain the good balance, thereby making it impossible to attain the given object of miniaturization of the zoom lens.

The conditional expression (10) relates particularly to the characteristics of the refractive index of the second a lens group which has the strong negative power. In order to reduce the strength of curvature which results from the acquisition of the strong negative power, the second a lens group must have a high refractive index, and in the event that a lower limit of the conditional expression is surpassed, the spherical aberration and coma aberration become too large because the curvature of the surface becomes too large, and the Petzval sum also becomes too small, thereby making it impossible to obtain a good performance.

The conditional expression (11) is an achromatism condition which constitutes the base of the second lens group and is also a condition for maintaining a good chromatic aberration correction. The conditional expression represents the balance of the dispersion characteristics of the glass material which is used for the second a lens group which is responsible for the large negative power in the second lens group which has the strong negative power, and it is important to suppress the basic chromatic aberration generated in the interior of the second lens group to a small level by balancing the dispersion characteristics. By selecting a glass material for these lens elements under the condition expressed by the conditional expression (11), a proper power distribution can be realized, thereby making it possible to correct the chromatic aberration properly. In the event that an upper limit is surpassed, the power of each lens element becomes too large due to the correction of chromatic aberration, and therefore, the aberrations are deteriorated.

Furthermore, a focusing operation is preferably attained by moving the second lens group in the direction of the optical axis, and at least one side of the magnifying side lens element of the second a lens group which makes up the second lens group is preferably aspheric, and the following conditional expression (12) is preferably satisfied with respect to a power to be set, the following conditional expression (13) is preferably satisfied with respect to a configuration of a magnifying side surface of the lens element of the second a lens group which is disposed next to the magnifying side lens element thereof, and the following conditional expression (14) is preferably satisfied with respect to the refractive index of the glass material used for the negative lens elements making up the second lens group:

$$-0.9 < f_W/f_{IIa1} < -0.5 \quad (12)$$

$$-0.9 < f_W/r_{IIa3} < -0.35 \quad (13)$$

$$1.65 < (n_{IIa1} + n_{IIa2} + n_{IIb1})/3 \quad (14)$$

where, $f_{IIa1}$: focal length of the lens element which makes up the second a lens group and which is disposed closest to the magnifying side;

$r_{IIa3}$: radius of curvature of the magnifying side surface of the lens element which makes up the second a lens group and which is disposed next to the magnifying side lens element thereof;

$n_{IIa1}$: refractive index of the lens element which makes up the second a lens group and which is disposed closest to the magnifying side relative to the line d;

$n_{IIa2}$: refractive index of the lens element which makes up the second a lens group and which is disposed next to the magnifying side lens element thereof relative to the line d;

$n_{IIb1}$: refractive index of the lens element which makes up the second b lens group and which is disposed closest to the magnifying side relative to the line d.

The conditional expression (12) relates to the power set to the most magnifying side lens element of the second a lens group, which affects off-axis aberrations largely. In the event that an upper limit is surpassed, the negative power becomes too small, and a sufficient measure cannot be taken to correct the off-axial aberrations, whereas in the event that a lower limit is surpassed, the negative power becomes too large, and the aberrations including chromatic aberration are deteriorated.

The conditional expression (13) relates to the configuration of the magnifying side surface of the lens element which makes up the second a lens group and which is disposed next to the magnifying side lens element thereof and constitutes, together with the conditional expressions (12) and (8), a condition for maintaining the balance of off-axis aberrations in the second a lens group. In the event that an upper limit is surpassed, the radius of curvature of the relevant surface becomes large to reduce the curvature, whereas in the event that a lower limit is surpassed, the same curvature becomes large on the contrary. In either of the cases, it becomes difficult to correct chromatic aberration of magnification and distortion which are off-axis aberrations.

The following conditional expression (14) is a condition for correction of field curvature. The refractive index of the negative lens elements is increased to decrease the Petzval sum, and therefore, in the event that a lower limit is surpassed, the field curvature is increased.

Furthermore, the third lens group is made up of a total of one or two lens elements including at least one positive lens element, and the following conditional expression (15) is preferably satisfied with respect to a power condition which is set to the third lens group in relation to the second lens group and the following conditional expression (16) is preferably satisfied with respect to the configuration of a contracting side surface of the third lens group:

$$0.8 < f_{II-III}/f_{II} < 2.2 \quad (15)$$

$$-0.65 < f_W/r_{IIIL} < -0.1 \quad (16)$$

where, $R_{IIIL}$: radius of curvature of the contracting side surface of the lens element of the third lens group which is disposed to the contracting side.

As has been described above, while the same function is given to the second lens group and the third lens group with respect to variable power, that is, the function to be responsible for the strong negative component as a whole, the powers given to the respective groups are largely different. In consideration of the constitution of the whole system, it is understood that it is good that the negative power concentrates on the magnifying side. Namely, this means that the negative power is made to concentrate on the second lens group, while a low power is given to the third lens group, in which case the third lens group may have a negative or positive power. In addition, this largely relates to the relationship with a focusing operation.

Although it is good that the focusing operation is performed in the second lens group, there is generated a restriction on the traveling amount of the second lens when it performs the relevant operation. Although giving a large power to the second lens group is advantageous in that a change in performance due to focusing distance is decreased, there is caused a possibility that the traveling amount becomes too small on the contrary, whereby it becomes mechanically impossible to perform the focusing operation in the second lens group. What represents the balance of traveling amount is the conditional expression (15). Consequently, surpassing an upper limit of the conditional expression (15) means a large negative power of the second lens group, and while this is advantageous to suppress the change in performance, since it is mechanically difficult to realize such a configuration, the configuration cannot be adopted as long as a special condition is given. On the contrary, since surpassing a lower limit means that the change in performance by virtue of focusing distance becomes large, generally, this causes a design problem.

In other words, the conditional expression (16) means that it is good that the contracting side surface of the third lens group is kept generally in a concentric shape relative to a bundle of rays of light which is generated mainly by the large negative power on the magnifying side of the second lens group. By this lens configuration, the generation of respective aberrations including spherical aberration is suppressed to a low level, and furthermore, it is important that such concentricity is generally maintained relative to a change in the bundle of rays of light due to a change in focal length. If this is not true, even in the event that an upper limit as well as a lower limit is surpassed in the conditional expression (16), it becomes unable to maintain a good performance over the whole range of variable power.

Furthermore, the following conditional expression (17) is preferably satisfied with respect to a power set to the third lens group, and the following conditional expression (18) is preferably satisfied with respect to variation in the airspace between the second lens group and the third lens group relative to a magnification varying operation from the wide angle end to the telephoto end:

$$f_W/|f_{III}| < 0.4 \quad (17)$$

$$|d_{II-III}|/f_W < 0.3 \quad (18)$$

where, $f_{III}$: composite focal length of the third lens group;

$d_{II-III}$: variation in the airspace between the second lens group and the third lens group relative to the magnification varying operation from the wide angle end to the telephoto end (focused at the magnifying side object distance of 1700 mm from the lens surface of the first lens group which is situated closest to the magnifying side).

As has been described before, the positional relationship between the second lens group and the third lens group changes little during the magnification varying operation. When looking at these two lens groups from the viewpoint of power, the change in performance during the focusing operation as well as the magnification varying operation is successfully suppressed to a low level by adding the third lens group which has the small power to the second lens group which has the large negative power. Restricting conditions for this characteristic is expressed by the conditional expression (17) and the conditional expression (18), and in the event that power increases to exceed an upper limit in the conditional expression (17), the decrease in performance is increased, in particular, while focusing is being operated. In addition, the departure from a range defined by the conditional expression (18) means that the variation is increased, and hence, more space becomes necessary, whereby miniaturization becomes difficult, and the change in performance during focusing is increased.

Furthermore, the fourth lens group is made up by disposing, in order from a magnifying side thereof, a fourth a lens group, a fourth b lens group and a fourth c lens group, the fourth a lens group having a positive refractive power as a whole and being made up by disposing a total of one to three lens elements including at least one positive lens element, the fourth b lens group being made up by disposing one negative lens element, and the fourth c lens group having a positive refractive power as a whole and being made up by disposing a total of three or four lens elements including at least two positive lens elements and one negative lens element. In addition, the following conditional expression (19), conditional expression (20) and conditional expression (21) are satisfied with respect to powers set to the fourth a lens group, fourth b lens group and fourth c lens group, respectively, and the following conditional expression (22) is satisfied with respect to the characteristics of the refractive index of a glass material used for each of the positive lens elements which make up the fourth lens group:

$$0.35 < f_w/f_{IVa} < 0.65 \quad (19)$$

$$-0.45 < f_w/f_{IVb} < -0.15 \quad (20)$$

$$0.2 < f_w/f_{IVc} < 0.5 \quad (21)$$

$$N_{IVP} < 1.7 \quad (22)$$

where, $f_{IVa}$: composite focal length of the fourth a lens group which makes up the fourth lens group;

$f_{IVb}$: composite focal length of the fourth b lens group which makes up the fourth lens group;

$f_{IVc}$: composite focal length of the fourth c lens group which makes up the fourth lens group;

$N_{IVP}$: mean value of refractive indexes of the respective positive lens elements which make up the fourth lens group relative to the line d.

The conditional expression (19) relates to the fourth a lens group which is disposed on the magnifying side of the fourth lens group and which has a strong positive power, and one or two positive lens elements are necessary in the constituent lens elements. This conditional expression represents a condition for giving a large positive power so as to receive and make a bundle of rays of light which is diffused from the second lens group to the fourth lens group converge and correcting aberrations properly. In the event that an upper limit is surpassed, the positive power becomes too large, whereas in the event that a lower limit is surpassed, on the contrary, the positive power for convergence of the bundle of rays of light becomes insufficient. In either of the cases, the spherical aberration and chromatic aberration are largely affected.

The conditional expression (20) relates to the power of the fourth b lens group, and disposing this lens group in combination with the positive powers of the fourth a and fourth c lens groups is critical to basically suppress aberrations such as chromatic aberration and field curvature to a low level. In the event that the fourth b lens group has a negative power, the configuration of powers of the fourth lens group results in a triplet made up of the positive power by the fourth a lens group, the negative power by the fourth b lens group and the positive power by the fourth c lens group, and although this configuration is advantageous in correcting aberrations, when looking at the respective elements, since the negative lens elements reside in the group having the positive power, the group configuration does not necessarily have to have the triplet configuration. However, in the event that an upper limit is surpassed, since the group powers of the fourth a lens group and the fourth c lens group become small to cope with correction of chromatic aberration, the Petzval sum cannot be decreased. In the event that a lower limit is surpassed, since a combination of a strong positive power and a negative power results, on the contrary, higher order spherical aberration and coma aberration become excessive.

In addition, the conditional expression (21) is such as to specify the power of the fourth c lens group. By distributing properly the positive power of the fourth lens group as expressed by the conditional expressions (19) and (21), a good performance can be obtained. In the event that an upper limit is surpassed, the power of the fourth c lens group becomes too large, whereas in the event that a lower limit is surpassed, the power of the fourth a lens group becomes too large, and in either of the cases, a good performance cannot be obtained.

On the other hand, the conditional expression (22) relates to the refractive index of the positive lens elements of the constituent lens elements and represents a condition which is necessary in correcting field curvature. To realize the miniaturization of the zoom lens, the negative second lens group has the strong negative power, whereby the Petzval sum tends to become easily too small. By suppressing the refractive index of the positive lens elements which make up the fourth lens group to a low level by the conditional expression (22), a correction is performed while maintaining a good balance therewith. Consequently, in the event that an upper limit is surpassed, the field curvature is overcorrected.

Furthermore, the following conditional expression (23) is preferably satisfied with respect to the configuration of a magnifying side surface of the lens element of the fourth a lens group which is disposed closest to the magnifying side, and the following conditional expression (24) is preferably satisfied with respect to the dispersion characteristics of a glass material which is used for each of the positive lens elements which make up the fourth a lens group:

$$-0.05 < f_w/r_{IVa1} < 0.85 \quad (23)$$

$$55 < V_{IvaP} \quad (24)$$

where, $r_{IVa1}$: radius of curvature of the magnifying side surface of the lens element of the fourth a lens group which is disposed closest to the magnifying side;

$V_{IVaP}$: mean value of Abbe numbers of the respective positive lens element which make up the fourth a lens group.

The conditional expression (23) is a conditional expression for correcting spherical aberration with good balance. Namely, as to the configuration of the magnifying side surface of the most magnifying side lens element of the fourth a lens group, a configuration is given which has a strong positive power to lead a bundle of rays of light which emerges from the third lens group in a diffused state into a converging state, and as a result of this, a larger under spherical aberration is generated. In conjunction with this, as will be described later on, a well-balanced relative construction is adopted in which a large over spherical aberration is made to be generated on the magnifying side surface of the most magnifying side lens element of the fourth b lens group. Consequently, in the event that an upper limit of the conditional expression (23) is surpassed, the under spherical aberration becomes large, whereas in the event that a lower limit is surpassed, the over spherical aberration becomes large. However, the number of positive lens elements which make up the fourth a lens group is deeply involved, and although it is natural to say, having two positive lens elements produces a higher possibility that a value near to the lower limit of the range of the conditional expression is taken.

In addition, the conditional expression (24) represents a condition for correcting chromatic aberration. As has been described above, since the fourth a lens group has the strong positive power, it largely affects chromatic aberration. Consequently, as is expressed by the conditional expression (24), it is inevitable to use a material which has a large Abbe number (that is, small dispersion) for the positive lens elements. In the event that a lower limit is surpassed, the chromatic aberration relative to a short wavelength in the fourth a lens group becomes large towards the under side, and it becomes difficult to correct the chromatic aberration properly.

Furthermore, the following conditional expression (25) is preferably satisfied with respect to the configuration of a magnifying side surface of the fourth b lens group:

$$-0.8 < f_w/r_{IVb1} < -0.35 \quad (25)$$

where, $r_{IVb1}$: radius of curvature of the magnifying side surface of the fourth b lens group.

The conditional expression (25) is a conditional expression which corrects spherical aberration with good balance together with the conditional expression (23), as has been described previously. Since the relative constructions that have been described above are adopted, in the event that a lower limit is surpassed in the conditional expression (25), the over spherical aberration becomes large, whereas in the event that an upper limit is surpassed, the under spherical aberration becomes large.

Furthermore, the following conditional expression (26) is preferably satisfied with respect to the configuration of a contracting side surface of a lens element of the fourth c lens group which is disposed closest to the contracting side, and the following conditional expression (27) is preferably satisfied with respect to the dispersion characteristics of a glass material which is used for each of the lens elements which make up the fourth c lens group:

$$-0.6 < f_w/r_{IVcL} < 0.05 \quad (26)$$

$$15 < V_{IVcP} - V_{IVcN} \quad (27)$$

where, $r_{IVcL}$: radius of curvature of the contracting side surface of the lens element of the fourth c lens group which is disposed closest to the contracting side;

$V_{IVcP}$: mean value of Abbe numbers of the respective positive lens elements which make up the fourth c lens group;

$V_{IVcN}$: mean value of Abbe numbers of the respective negative lens elements which make up the fourth c lens group.

The conditional expression (26) is a conditional expression for correcting the spherical aberration over the whole lens system in an elaborate fashion. The correction performed in a way expressed by the conditional expression is such as to correct the residual spherical aberration which remains uncorrected even by the configurations of the magnifying side surface of the most magnifying side lens element of the fourth a lens group and the magnifying side surface of the most magnifying side lens element of the fourth b lens group, which surfaces are dominant in correction of spherical aberration. In the event that an upper limit is surpassed, an insufficient under correction results, and on the contrary, in the event that a lower limit is surpassed, an excessive or over correction results.

The conditional expression (27) is a condition for color correction in the fourth c lens group. In order to correct monochromatic aberration, it is necessary that the power of each lens element does not become overpowered, and to make this happen, it is a necessary condition that the positive lens element and negative lens element have to have Abbe numbers which satisfy the conditional expression (27). In the event that a lower limit is surpassed, it becomes difficult to correct chromatic aberration.

Furthermore, the fourth c lens group is configured to include a partial system constituent element which is made up of at least two lens elements, one negative lens element and one positive lens element, which are cemented together, and the following conditional expression (28) is preferably satisfied with respect to the refractive index of a glass material used for each of the lens elements which are cemented together, and the following conditional expression (29) is preferably satisfied similarly with respect to the dispersion characteristics of the glass material used for each of the lens elements which are cemented together:

$$0.25 < N_{IVcCN} - N_{IVcCP} \quad (28)$$

$$30 < V_{IVcCP} - V_{IVcCN} \quad (28)$$

where, $N_{IVcCP}$: mean value of the refractive indexes of the positive lens elements of the fourth c lens group which are disposed in the cemented partial system thereof relative to the line d;

$N_{IVcCN}$: mean value of the refractive indexes of the negative lens elements of the fourth c lens group which are disposed in the cemented partial system thereof relative to the line d;

$V_{IVcCP}$: mean value of Abbe numbers of the positive lens elements of the fourth c lens group which are disposed in the cemented partial system thereof;

$V_{IVcCN}$: mean value of Abbe numbers of the negative lens elements of the fourth c lens group which are disposed in the cemented partial system thereof.

As for the cemented partial system of the fourth c lens group, a difference in refractive index is given to the cemented lens for expectation of a field curvature correcting effect while maintaining the correction capability of spherical aberration at the cementing surface. In the event that a lower limit is surpassed in the conditional expression (28), field curvature is overcorrected, while spherical aberration is undercorrected. In addition, the conditional expression (29) is a conditional expression relating to the correction of chromatic aberration in the whole lens system, and in the event that a lower limit is surpassed, in particular, the chromatic aberration of magnification is increased.

Figure 11:
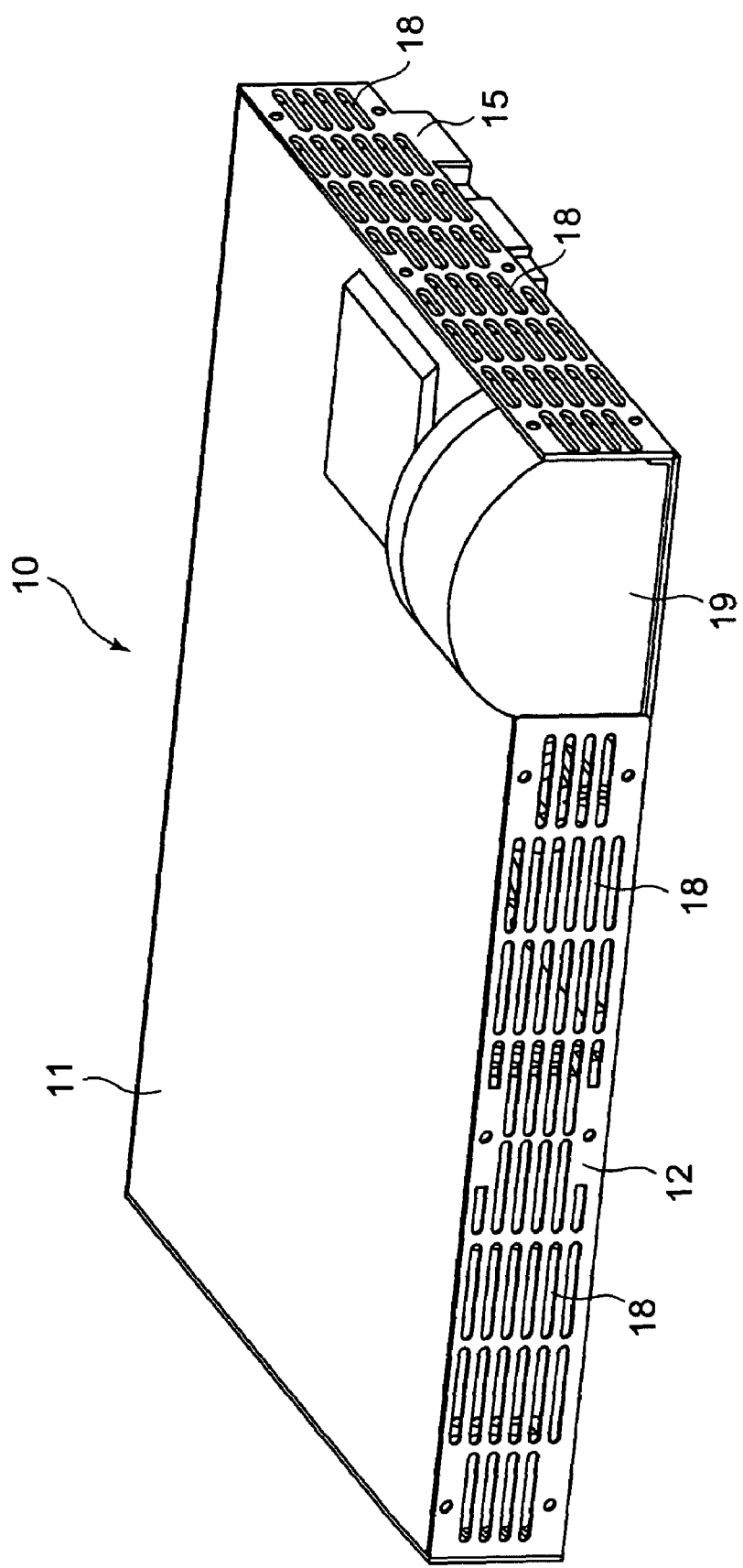
FIG. 11 is an external view of a projector which utilizes the zoom lens according to the invention.

In addition, an external view of a projector which incorporates therein the zoom lens according to the invention is shown in FIG. 11. As is shown in FIG. 11, a projector 10 is formed substantially into a rectangular parallelepiped shape and has a lens cover 19 which covers a projection port provided to a side of a front panel 12 which makes up a main body case, and a plurality of vent holes 18 are provided in the front panel 12. In addition, although the illustration thereof in FIG. 11 is omitted, a key/indicator part is provided on an top panel 11 of the main body case, and provided on this key/indicator part has keys and indicators including a power switch key, a power indicator for informing an ON or OFF state of power, a lamp switch key for turning on a lamp of a light source device, a lamp indicator for indicating the illumination of the lamp, and an overheat indicator for informing the overheat of the light source when it actually occurs. Furthermore, on a back side, not shown, of the main body case, an I/O connector portion where USB terminal, image inputting D-SUB terminal, S terminal, RCA terminal and the like are provided, a power supply adapter plug, and an Ir receiving portion which receives signals from a remote controller are provided on a back panel. In addition, a plurality of vent holes 18 are provided, respectively, on a right-side panel, not shown, which is a side panel of the main body case and a left-side panel 15 which is a side panel shown in FIG. 11, and a projection lens which is made up of the zoom lens that has been described heretofore is accommodated at the rear of the lens cover 19 in such a manner as to follow an inside of the left side panel 15.

Embodiment 1

Figure 2:
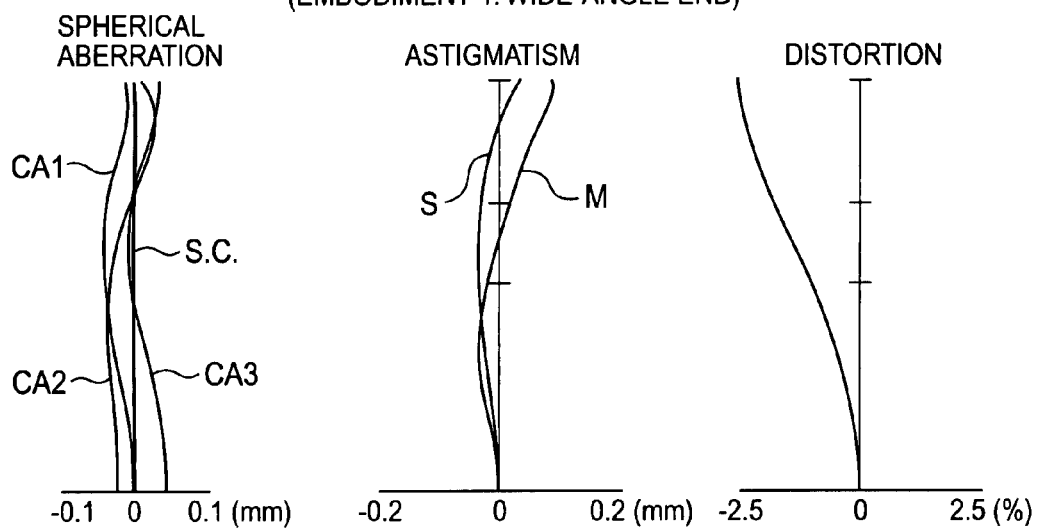
FIG. 2 is a drawing showing aberrations of the zoom lens of the first embodiment.
Figure 2:
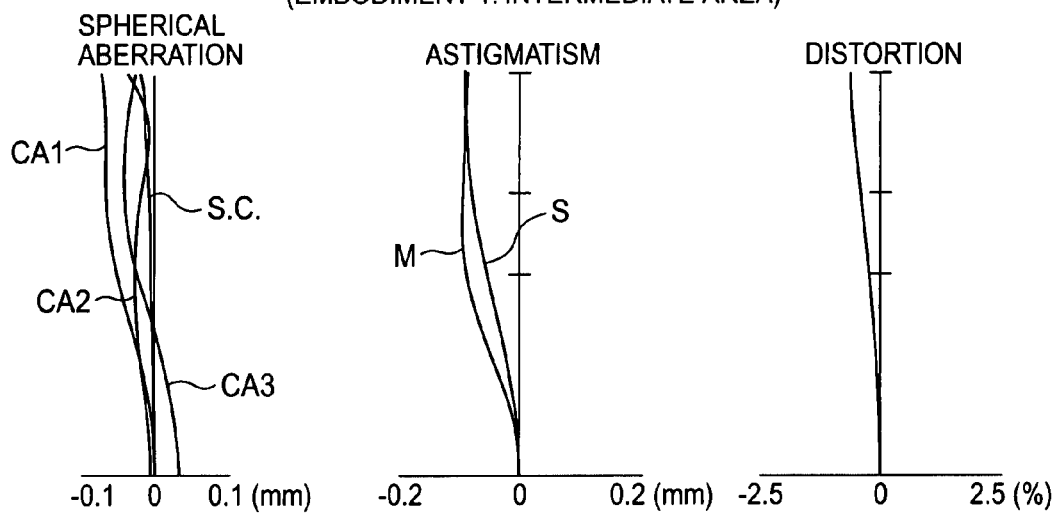
Figure 2:
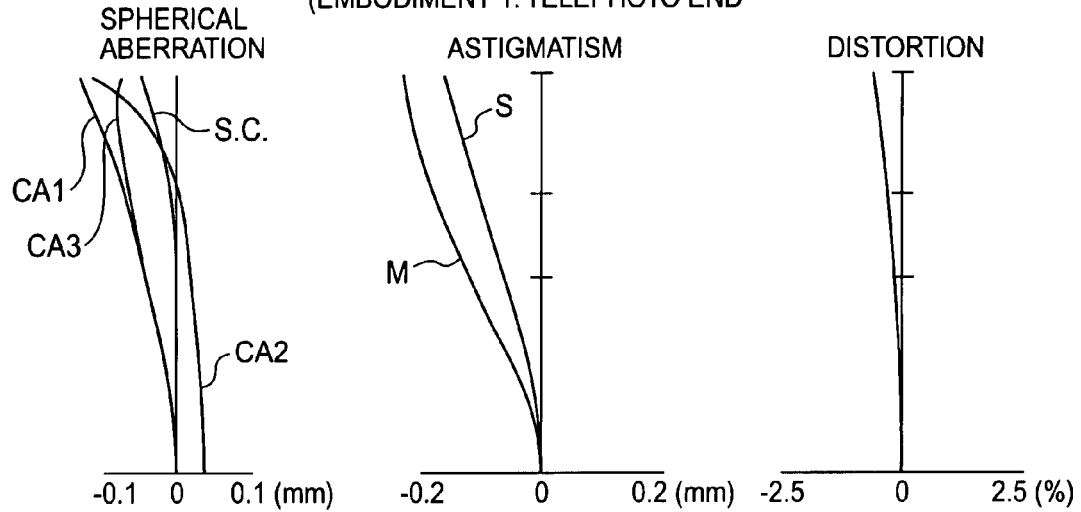

A numerical example for a first embodiment of a zoom lens of the invention is shown in Table 1. In addition, FIG. 1 is a drawing showing a lens configuration of the first embodiment and FIG. 2 shows drawings illustrating aberrations thereof. In the table and drawings, f denotes a focal length of the whole zoom lens system, $F_{no}$ an f number, and $2\omega$ a total angle of view of the zoom lens. In addition, r denotes radius of curvature, d lens thickness or space between lens elements, $n_d$ a refractive index relative to the line d, and [$4_d$]Abbe number of the line d (where, numerical values in the table which change by virtue of focusing operation are numerical values which result when an object distance from the surface 101 is 1700 mm in a focused state). CA1, CA2, CA3 in the spherical aberration drawings in the drawings showing aberrations are aberration curves in wavelengths of CA1=550.0 nm, CA2=435.8 nm and CA3=640.0 nm, respectively. In addition, S. C. is a sine condition. In aspherical aberration drawings, S denotes sagittal and M denotes meridional. In addition, throughout the tables, unless described specifically, a wavelength used in calculating various values is CA1=550.0 nm.

TABLE 1

|  | Wide angle end | Intermediate area | Telephoto end |
|---|---|---|---|
| f | 15.87 | 22.04 | 30.57 |
| $F_{no}$ | 2.29 | 2.66 | 3.25 |
| $2\omega$ | 66.15 | 49.33 | 36.53 |
| Hereinafter, airspaces which change by variable power | | | |
| D2 | 1.31 | 6.29 | 4.09 |
| D11 | 3.80 | 2.24 | 1.64 |
| D15 | 22.98 | 11.20 | 1.00 |
| D24 | 34.00 | 42.36 | 55.36 |

TABLE 1-continued

| Serial numbers | Surface numbers | r | d | $n_d$ | $\nu_d$ |
|---|---|---|---|---|---|
| 1 | 101 | 158.374 | 2.20 | 1.51680 | 64.20 |
| 2 | 102 | −399.780 | [D2] | — | — |
| 3 | 211 | 90.750 | 2.00 | 1.80139 | 45.45 |
| 4 | 212 | 14.479 | 5.42 | — | — |
| 5 | 213 | −33.586 | 1.41 | 1.80420 | 46.49 |
| 6 | 214 | 37.086 | 5.53 | 1.58144 | 40.89 |
| 7 | 215 | −16.071 | 0.80 | — | — |
| 8 | 221 | −13.582 | 1.40 | 1.80420 | 46.49 |
| 9 | 222 | −46.799 | 0.20 | — | — |
| 10 | 223 | ∞ | 2.71 | 1.80518 | 25.46 |
| 11 | 224 | −33.210 | [D11] | — | — |
| 12 | 301 | −18.794 | 1.40 | 1.74950 | 35.04 |
| 13 | 302 | −27.562 | 0.20 | — | — |
| 14 | 303 | ∞ | 2.30 | 1.49700 | 81.61 |
| 15 | 304 | −50.122 | [D15] | — | — |
| 16 | 411 | 25.357 | 4.88 | 1.56907 | 71.30 |
| 17 | 412 | −69.849 | 8.90 | — | — |
| 18 | 421 | −26.214 | 2.00 | 1.80486 | 24.74 |
| 19 | 422 | −54.485 | 5.06 | — | — |
| 20 | 431 | 181.629 | 4.04 | 1.69895 | 30.05 |
| 21 | 432 | −25.547 | 0.20 | — | — |
| 22 | 433 | −105.282 | 1.20 | 1.80610 | 33.27 |
| 23 | 434 | 19.335 | 6.38 | 1.49700 | 81.61 |
| 24 | 435 | −36.280 | [D24] | — | — |
| 25 | C01 | ∞ | 3.00 | 1.48745 | 64.84 |
| 26 | C02 | ∞ | — | — | — |

| Aspherical coefficient | |
|---|---|
| 211th surface | |
| K = | 4.49080E+00 |
| A = | 3.30822E−05 |
| B = | −1.12233E−07 |
| C = | 1.27961E−09 |
| D = | −7.91536E−12 |
| E = | 2.47526E−14 |
| 422nd surface | |
| K = | 0.00000E+00 |
| A = | 2.98111E−05 |
| B = | 2.98142E−08 |
| C = | −2.99724E−11 |

Embodiment 2

Figure 3:
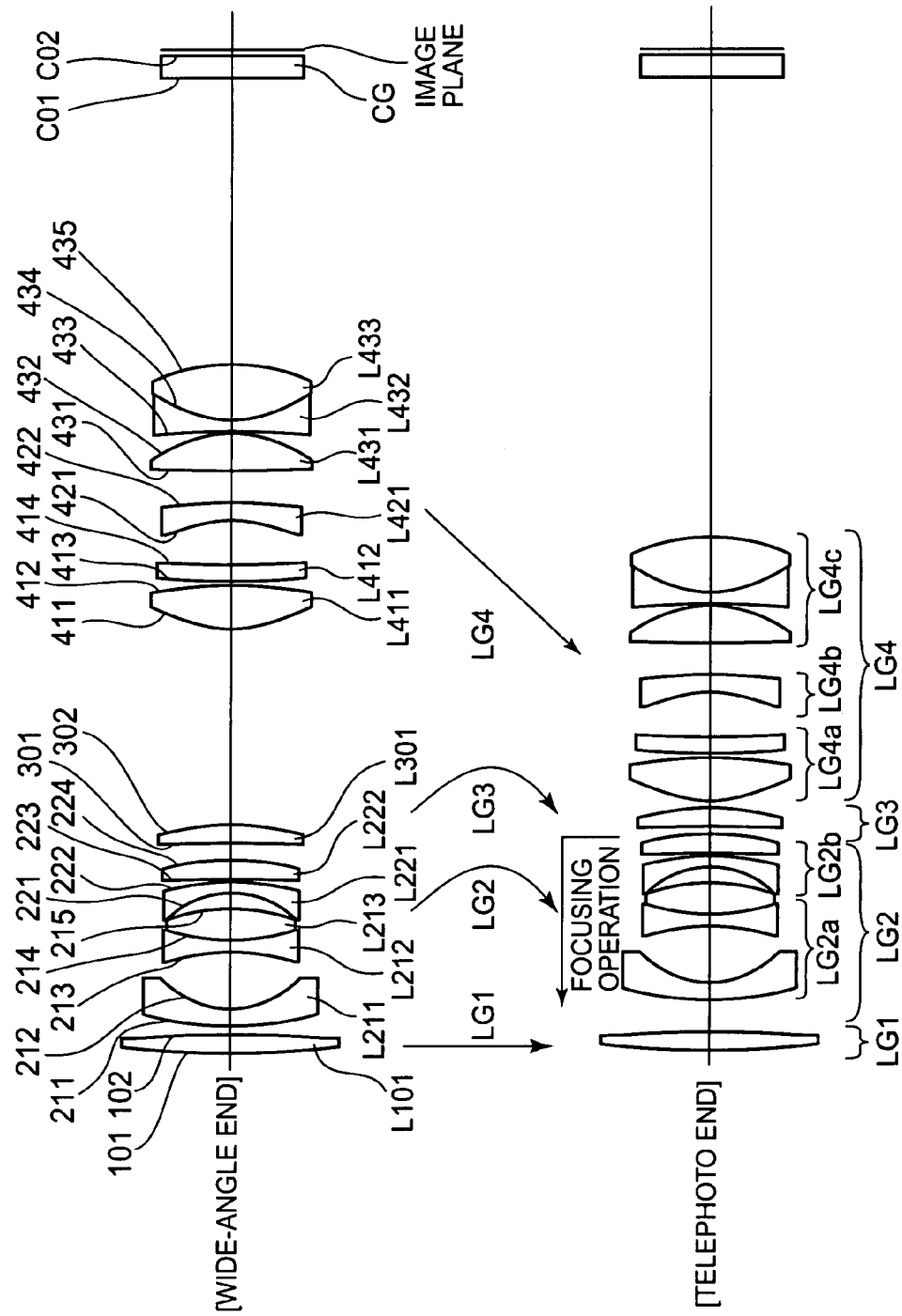
FIG. 3 is a drawing showing a lens configuration of a second embodiment of a zoom lens according to the invention.
Figure 4:
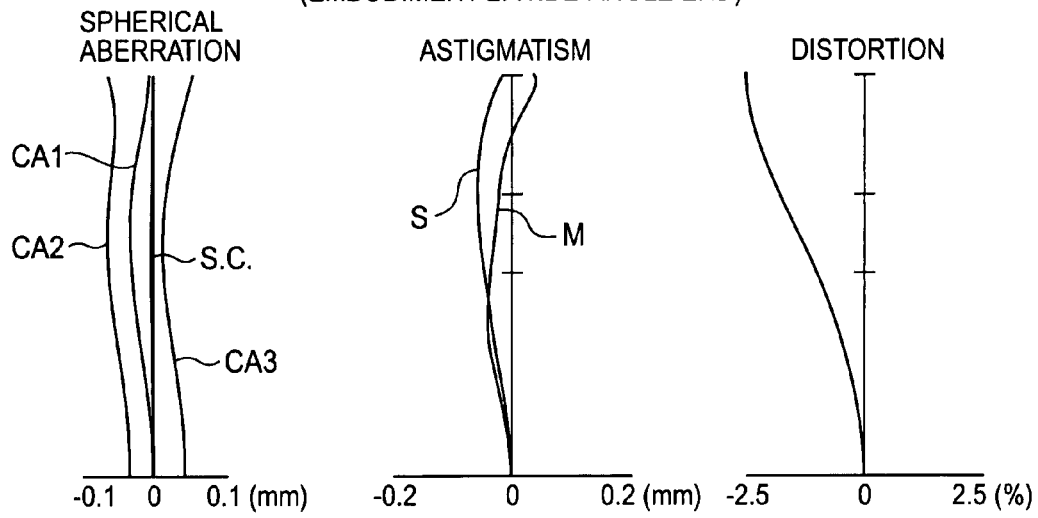
FIG. 4 is a drawing showing aberrations of the zoom lens of the second embodiment.
Figure 4:
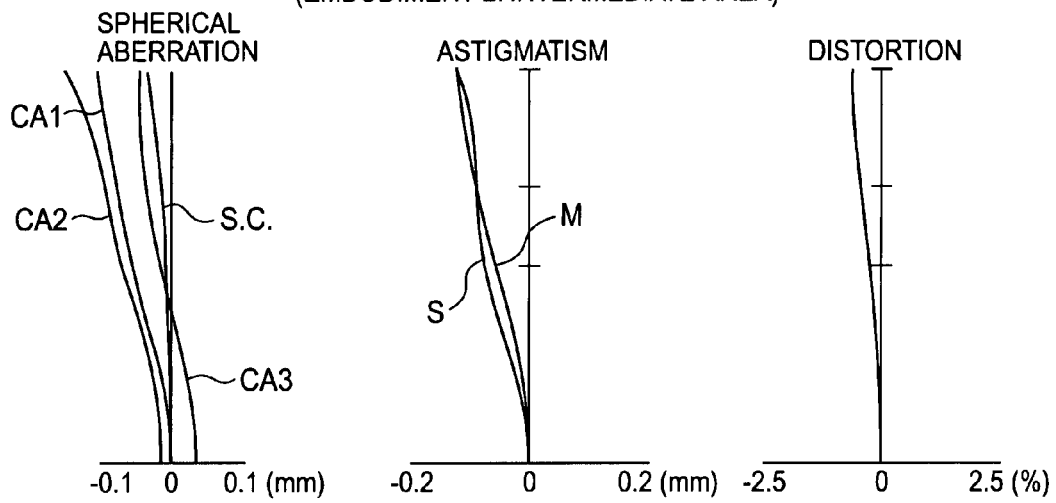
Figure 4:
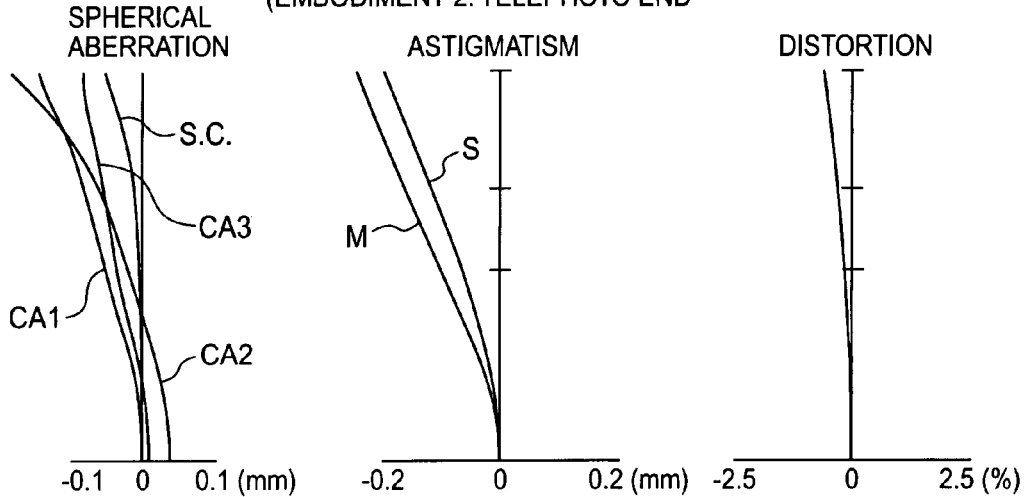

A numerical example for a second embodiment of a zoom lens of the invention is shown in Table 2. In addition, FIG. 3 is a drawing showing a lens configuration of the second embodiment and FIG. 4 shows drawings illustrating aberrations thereof.

TABLE 2

|  | Wide angle end | Intermediate area | Telephoto end |
|---|---|---|---|
| f | 15.92 | 22.10 | 30.69 |
| $F_{no}$ | 2.29 | 2.64 | 3.19 |
| $2\omega$ | 65.97 | 49.17 | 36.40 |
| Hereinafter, airspaces which change by variable power | | | |
| D2 | 1.00 | 6.04 | 3.77 |
| D11 | 2.10 | 1.54 | 1.00 |
| D13 | 23.24 | 10.70 | 0.79 |
| D24 | 34.00 | 42.06 | 54.78 |

| Serial numbers | Surface numbers | r | d | $n_d$ | $\nu_d$ |
|---|---|---|---|---|---|
| 1 | 101 | 135.483 | 2.27 | 1.48749 | 70.45 |
| 2 | 102 | −400.000 | [D2] | — | — |
| 3 | 211 | 98.721 | 2.00 | 1.80610 | 40.73 |
| 4 | 212 | 14.210 | 6.76 | — | — |

TABLE 2-continued

| | | | | | |
|---|---|---|---|---|---|
| 5 | 213 | −27.725 | 1.50 | 1.67003 | 47.19 |
| 6 | 214 | 43.044 | 3.75 | 1.75520 | 27.53 |
| 7 | 215 | −25.981 | 1.74 | — | — |
| 8 | 221 | −13.540 | 1.40 | 1.80420 | 46.49 |
| 9 | 222 | −37.782 | 0.20 | — | — |
| 10 | 223 | −576.704 | 2.33 | 1.48749 | 70.45 |
| 11 | 224 | −41.043 | [D11] | — | — |
| 12 | 301 | −193.387 | 2.24 | 1.54814 | 45.82 |
| 13 | 302 | −38.212 | [D13] | — | — |
| 14 | 411 | 22.762 | 5.46 | 1.49700 | 81.61 |
| 15 | 412 | −55.147 | 0.32 | — | — |
| 16 | 413 | 122.857 | 2.00 | 1.48749 | 70.45 |
| 17 | 414 | 180.172 | 5.45 | — | — |
| 18 | 421 | −23.819 | 2.00 | 1.80610 | 40.88 |
| 19 | 422 | −57.913 | 3.88 | — | — |
| 20 | 431 | 331.465 | 4.28 | 1.58144 | 40.89 |
| 21 | 432 | −22.564 | 0.20 | — | — |
| 22 | 433 | −193.633 | 1.40 | 1.80100 | 34.97 |
| 23 | 434 | 20.462 | 6.70 | 1.49700 | 81.61 |
| 24 | 435 | −31.335 | [D24] | — | — |
| 25 | C01 | ∞ | 3.00 | 1.48745 | 64.84 |
| 26 | C02 | ∞ | — | — | — |

Aspherical coefficient

211th surface

K = −2.53434E+00
A = 3.61240E−05
B = −9.82221E−08
C = 1.05387E−09
D = −5.98558E−12
E = 1.87008E−14

422nd surface

K = 7.22063E+00
A = 3.69502E−05
B = 3.36841E−08
C = −7.90594E−11

Embodiment 3

Figure 5:
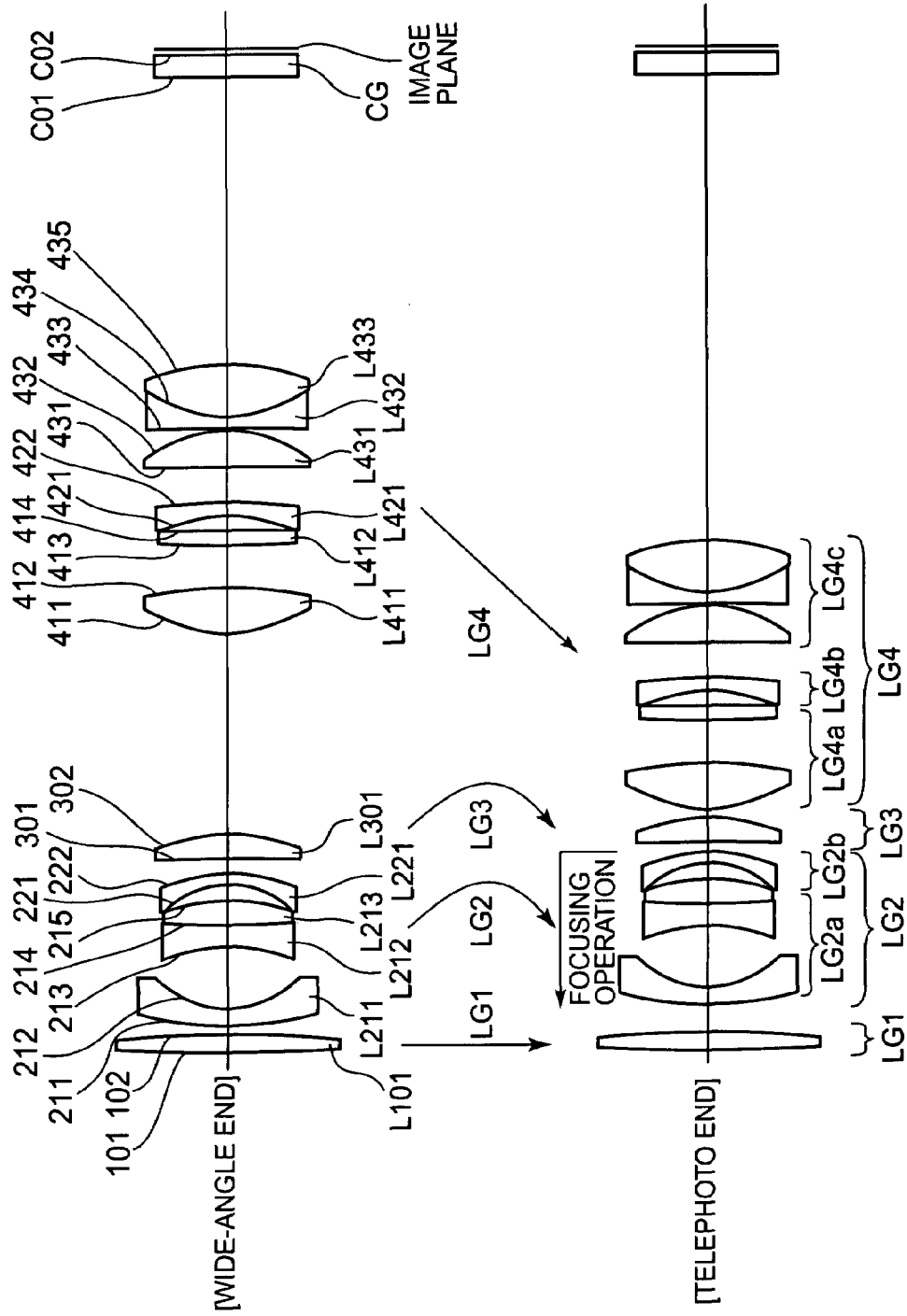
FIG. 5 is a drawing showing a lens configuration of a third embodiment of a zoom lens according to the invention.
Figure 6:
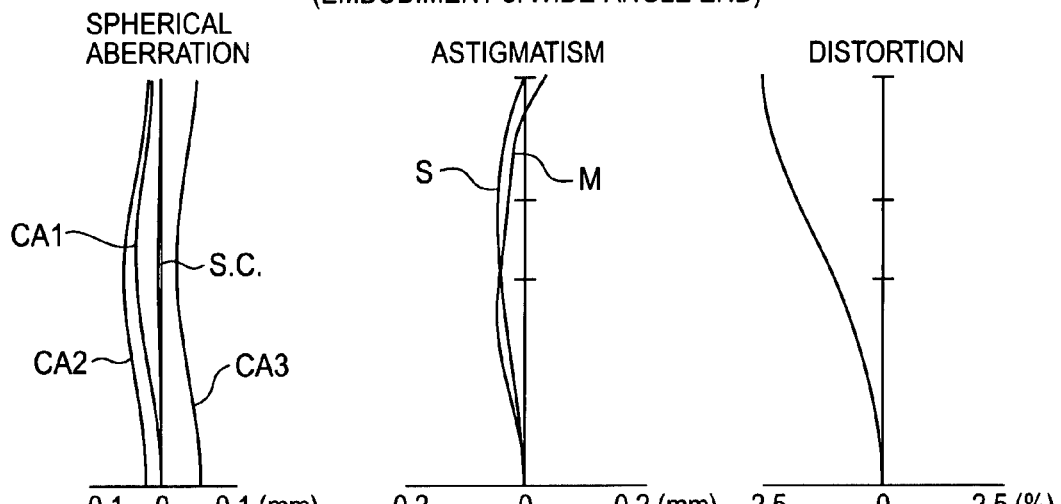
FIG. 6 is a drawing showing aberrations of the zoom lens of the third embodiment.
Figure 6:
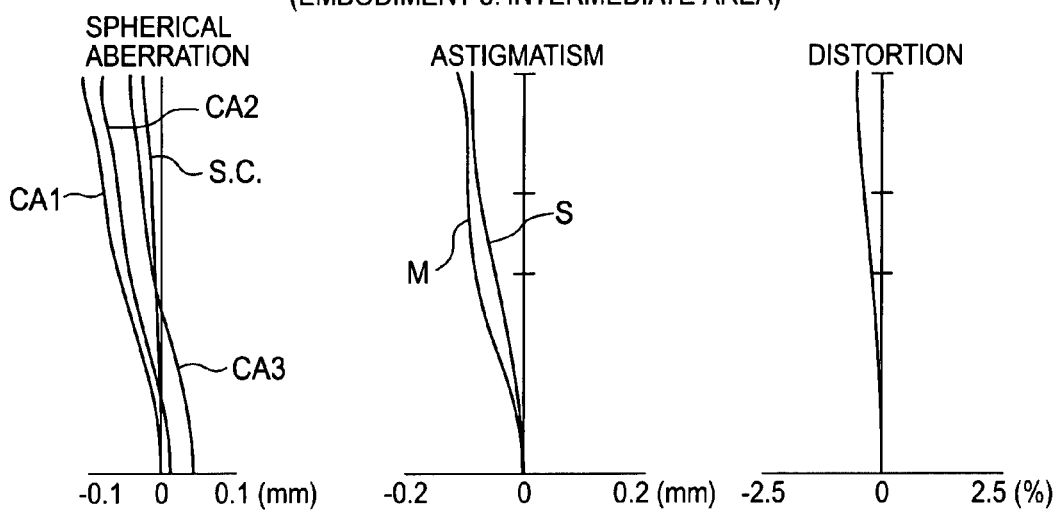
Figure 6:
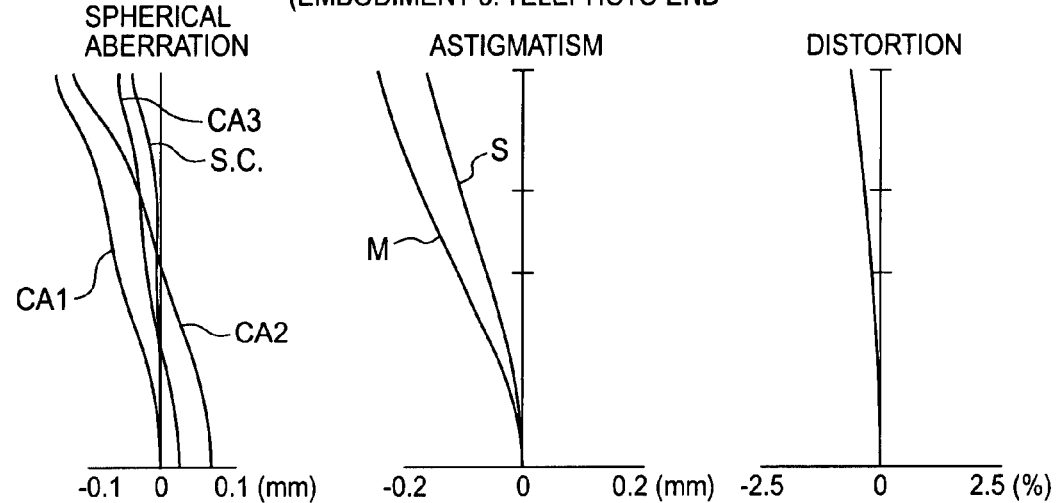

A numerical example for a third embodiment of a zoom lens of the invention is shown in Table 3. In addition, FIG. 5 is a drawing showing a lens configuration of the third embodiment and FIG. 6 shows drawings illustrating aberrations thereof.

TABLE 3

| | Wide angle end | Intermediate area | Telephoto end |
|---|---|---|---|
| f | 15.94 | 22.17 | 30.72 |
| $F_{no}$ | 2.29 | 2.66 | 3.23 |
| 2ω | 65.91 | 49.02 | 36.38 |

Hereinafter, airspaces which change by variable power

| | | | |
|---|---|---|---|
| D2 | 0.94 | 5.65 | 3.16 |
| D9 | 1.64 | 1.29 | 1.10 |
| D11 | 24.00 | 11.10 | 0.79 |
| D22 | 34.00 | 42.54 | 55.55 |

| Serial numbers | Surface numbers | r | d | $n_d$ | $v_d$ |
|---|---|---|---|---|---|
| 1 | 101 | 210.932 | 2.20 | 1.48749 | 70.45 |
| 2 | 102 | −217.678 | [D2] | — | — |
| 3 | 211 | 88.368 | 2.00 | 1.80610 | 40.73 |
| 4 | 212 | 14.052 | 7.60 | — | — |
| 5 | 213 | −25.318 | 2.69 | 1.62299 | 58.11 |
| 6 | 214 | 323.119 | 2.68 | 1.80518 | 25.46 |
| 7 | 215 | −32.527 | 2.04 | — | — |
| 8 | 221 | −13.683 | 1.40 | 1.80420 | 46.49 |
| 9 | 222 | −27.209 | [D9] | — | — |
| 10 | 301 | 946.502 | 3.02 | 1.53172 | 48.84 |
| 11 | 302 | −28.286 | [D11] | — | — |
| 12 | 411 | 22.112 | 5.58 | 1.49700 | 81.61 |
| 13 | 412 | −60.925 | 5.19 | — | — |
| 14 | 413 | 330.275 | 1.60 | 1.49700 | 81.61 |
| 15 | 414 | −593.952 | 1.87 | — | — |
| 16 | 421 | −23.262 | 1.60 | 1.80139 | 45.45 |
| 17 | 422 | −64.985 | 4.04 | — | — |
| 18 | 431 | 1177.916 | 4.55 | 1.51823 | 58.96 |
| 19 | 432 | −20.427 | 0.20 | — | — |
| 20 | 433 | 903.872 | 1.40 | 1.80100 | 34.97 |
| 21 | 434 | 21.729 | 6.23 | 1.48749 | 70.45 |
| 22 | 435 | −36.939 | [D22] | — | — |
| 23 | C01 | ∞ | 3.00 | 1.48745 | 64.84 |
| 24 | C02 | ∞ | — | — | — |

Aspherical coefficient

211th surface

K = −4.57751E−01
A = 3.33516E−05
B = −9.87538E−08
C = 8.90413E−10
D = −4.42113E−12
E = 1.15077E−14

422nd surface

K = 1.42700E+00
A = 3.49513E−05
B = 3.79813E−08
C = −1.21165E−10

Embodiment 4

Figure 7:
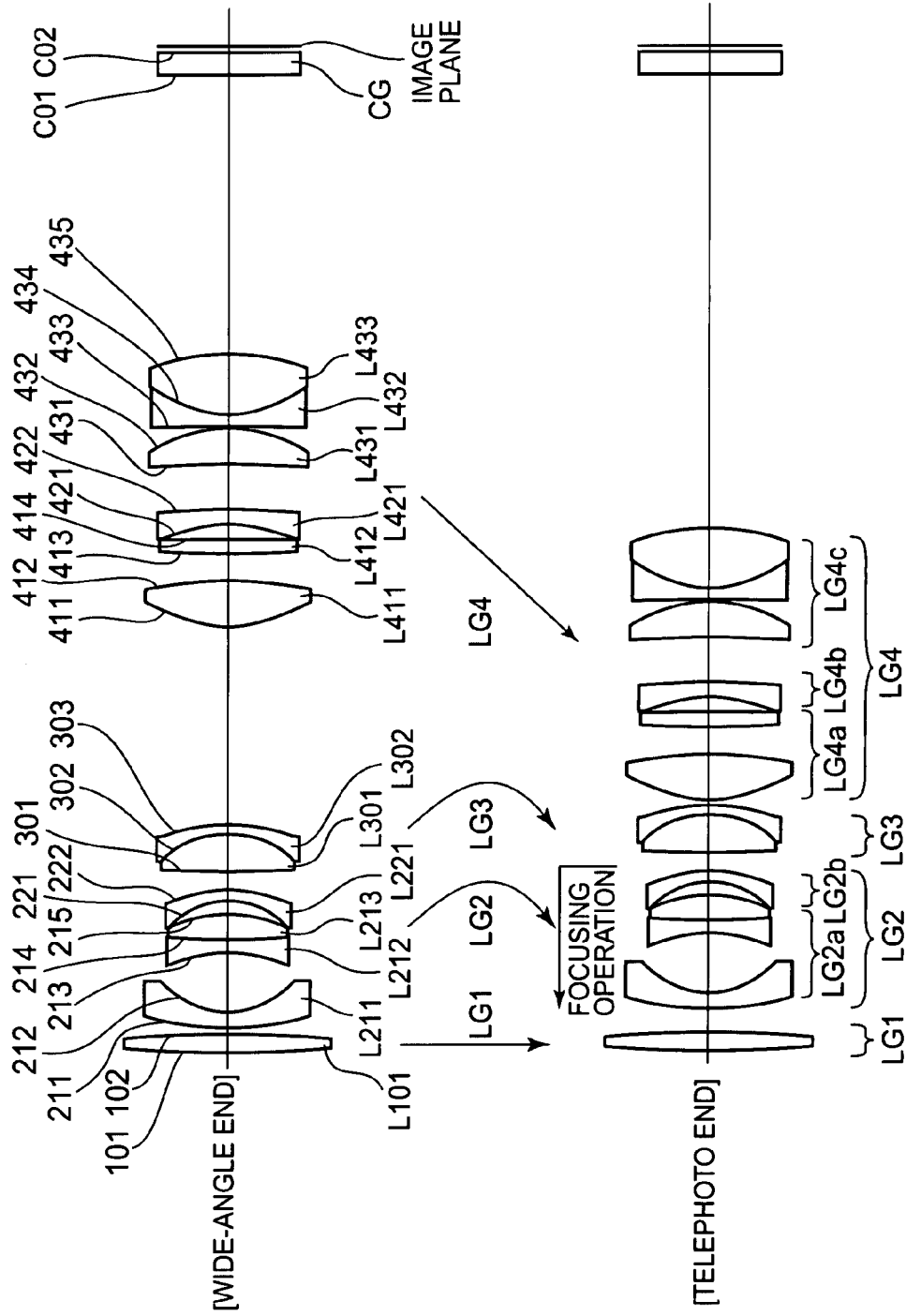
FIG. 7 is a drawing showing a lens configuration of a fourth embodiment of a zoom lens according to the invention.
Figure 8:
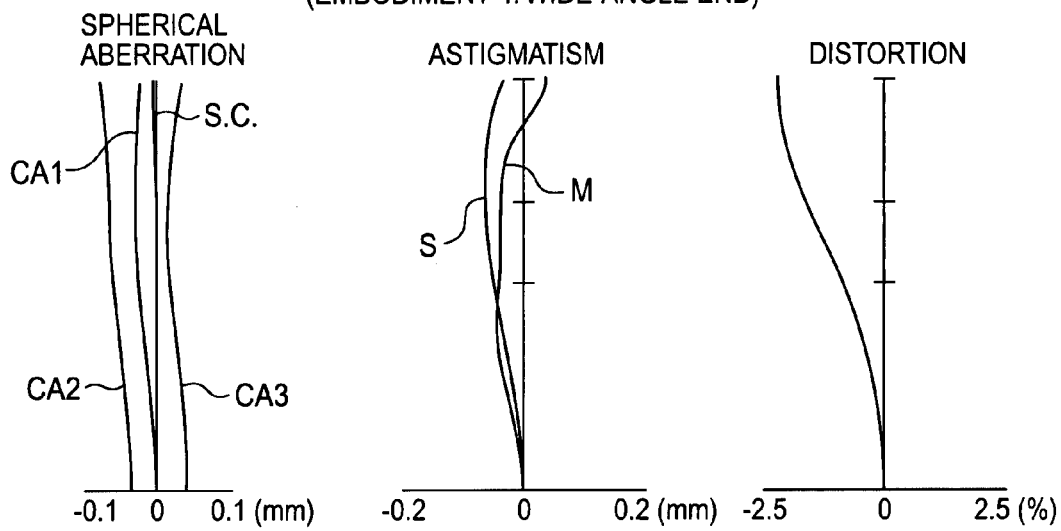
FIG. 8 is a drawing showing aberrations of the zoom lens of the fourth embodiment.
Figure 8:
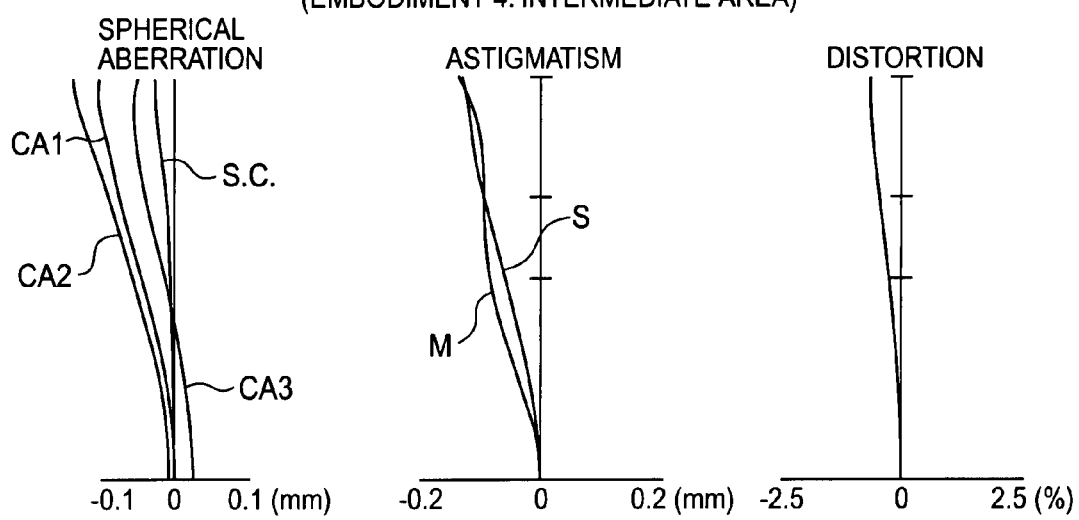
Figure 8:
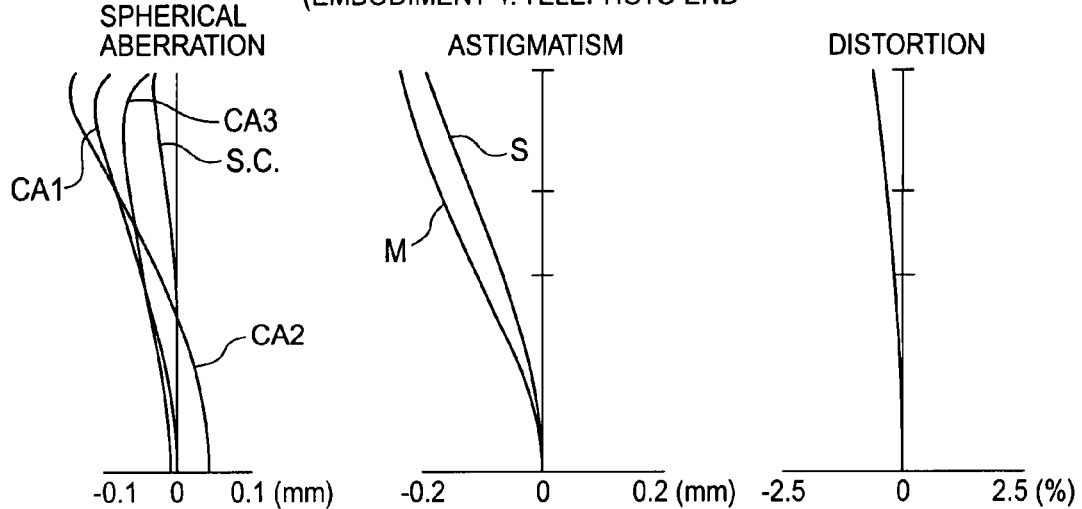

A numerical example for a fourth embodiment of a zoom lens of the invention is shown in Table 4. In addition, FIG. 7 is a drawing showing a lens configuration of the fourth embodiment and FIG. 8 shows drawings illustrating aberrations thereof.

TABLE 4

| | Wide angle end | Intermediate area | Telephoto end |
|---|---|---|---|
| f | 15.94 | 22.12 | 30.72 |
| $F_{no}$ | 2.29 | 2.64 | 3.21 |
| 2ω | 65.94 | 49.18 | 36.39 |

Hereinafter, airspaces which change by variable power

| | | | |
|---|---|---|---|
| D2 | 0.89 | 5.60 | 3.11 |
| D9 | 2.44 | 2.22 | 2.12 |
| D12 | 24.45 | 11.42 | 0.79 |
| D23 | 34.00 | 42.54 | 55.76 |

| Serial numbers | Surface numbers | r | d | $n_d$ | $v_d$ |
|---|---|---|---|---|---|
| 1 | 101 | 171.995 | 2.20 | 1.48749 | 70.45 |
| 2 | 102 | −286.169 | [D2] | — | — |
| 3 | 211 | 84.684 | 2.00 | 1.80610 | 40.73 |
| 4 | 212 | 14.770 | 7.45 | — | — |
| 5 | 213 | −21.609 | 1.50 | 1.80420 | 46.49 |
| 6 | 214 | 399.999 | 3.15 | 1.80518 | 25.46 |
| 7 | 215 | −23.096 | 1.60 | — | — |
| 8 | 221 | −13.365 | 1.40 | 1.80610 | 33.27 |
| 9 | 222 | −23.388 | [D9] | — | — |
| 10 | 301 | 165.654 | 4.49 | 1.59551 | 39.22 |
| 11 | 302 | −16.689 | 1.20 | 1.80610 | 40.73 |
| 12 | 303 | −34.878 | [D12] | — | — |
| 13 | 411 | 23.629 | 5.87 | 1.49700 | 81.61 |
| 14 | 412 | −51.401 | 3.26 | — | — |
| 15 | 413 | 155.893 | 2.00 | 1.48749 | 70.45 |
| 16 | 414 | −234.303 | 1.61 | — | — |
| 17 | 421 | −28.520 | 2.00 | 1.80139 | 45.45 |
| 18 | 422 | −75.991 | 5.58 | — | — |
| 19 | 431 | −116.706 | 4.44 | 1.56732 | 42.84 |

TABLE 4-continued

| | | | | | |
|---|---|---|---|---|---|
| 20 | 432 | −24.060 | 0.20 | — | — |
| 21 | 433 | 400.000 | 1.40 | 1.80100 | 34.97 |
| 22 | 434 | 19.306 | 7.53 | 1.49700 | 81.61 |
| 23 | 435 | −39.014 | [D23] | — | — |
| 24 | C01 | ∞ | 3.00 | 1.48745 | 64.84 |
| 25 | C02 | ∞ | — | — | — |

Aspherical coefficient

211th surface

K = −9.84074E−01
A = 3.59269E−05
B = −1.00683E−07
C = 1.34019E−09
D = −8.31337E−12
E = 2.70068E−14

422nd surface

K = −3.38644E−02
A = 2.52021E−05
B = 1.42373E−08
C = −3.00217E−11

Embodiment 5

Figure 9:
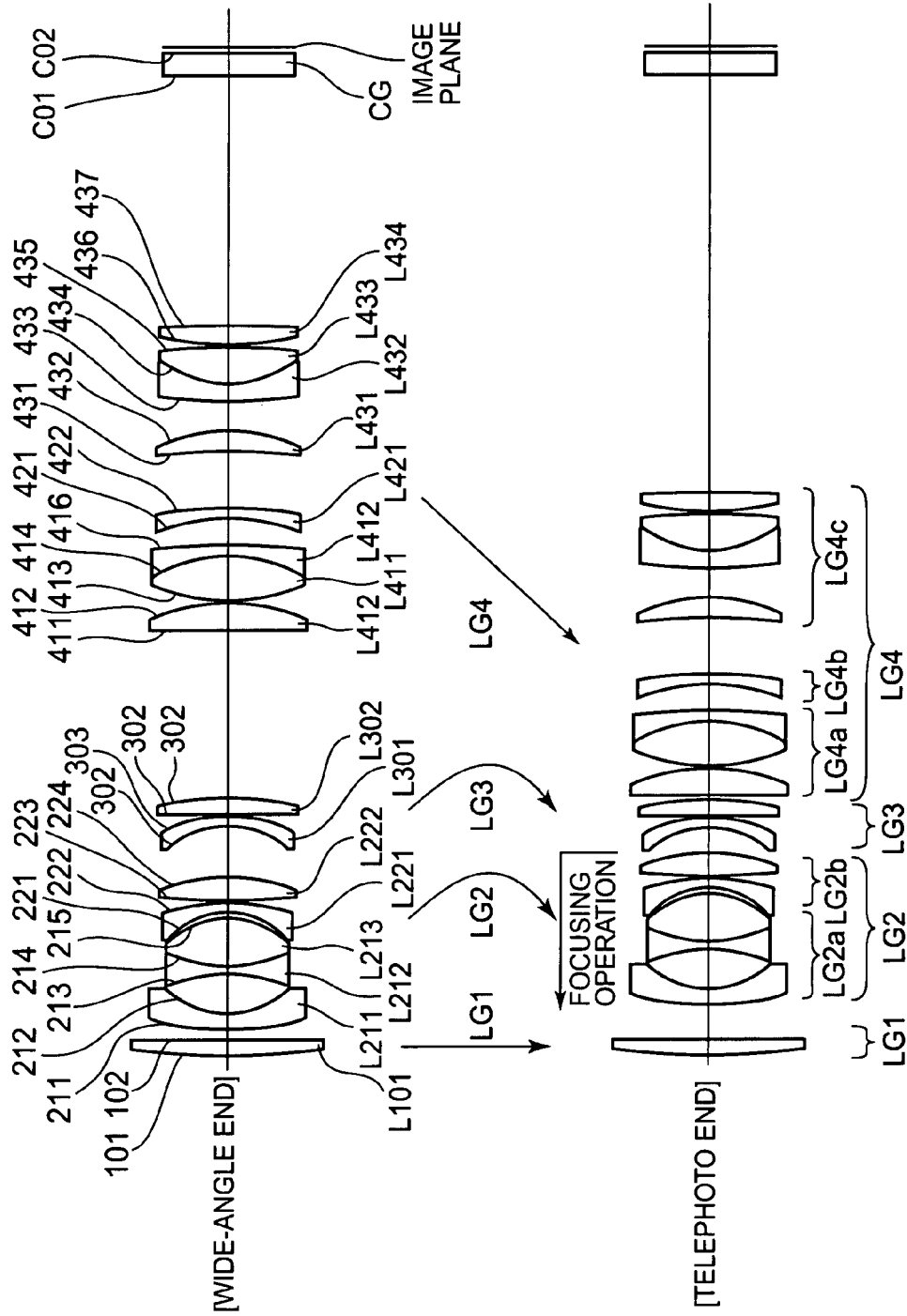
FIG. 9 is a drawing showing a lens configuration of a fifth embodiment of a zoom lens according to the invention.
Figure 10:
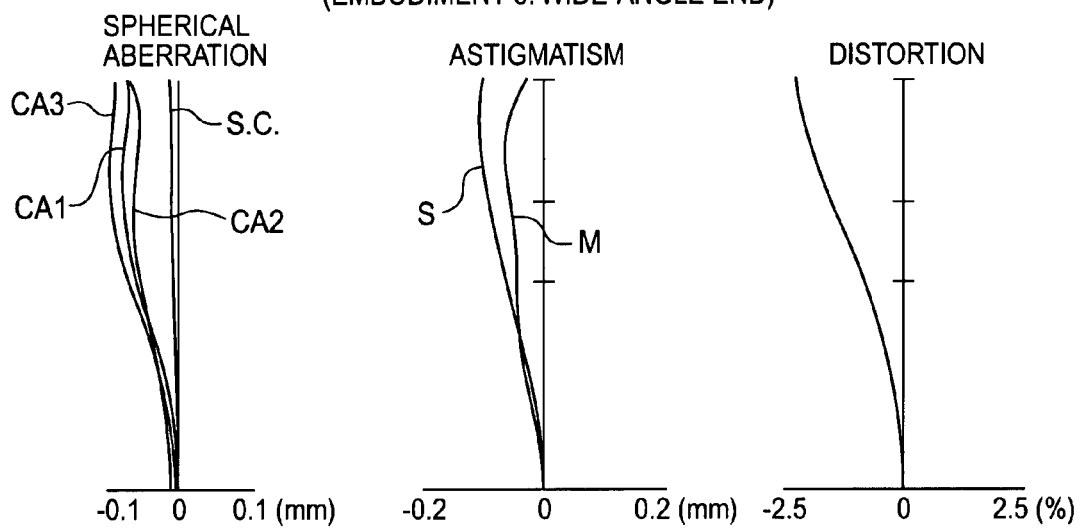
FIG. 10 is a drawing showing aberrations of the zoom lens of the fifth embodiment.
Figure 10:
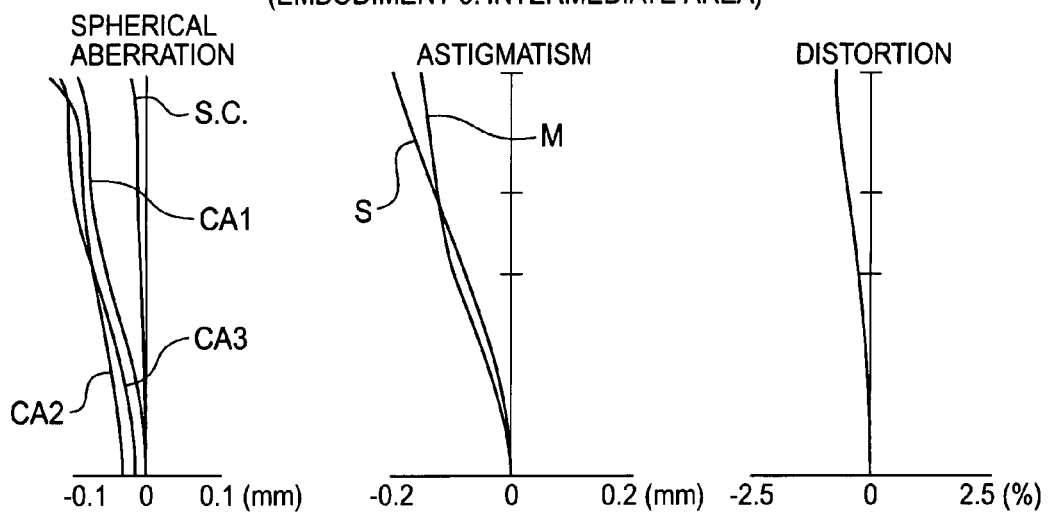
Figure 10:
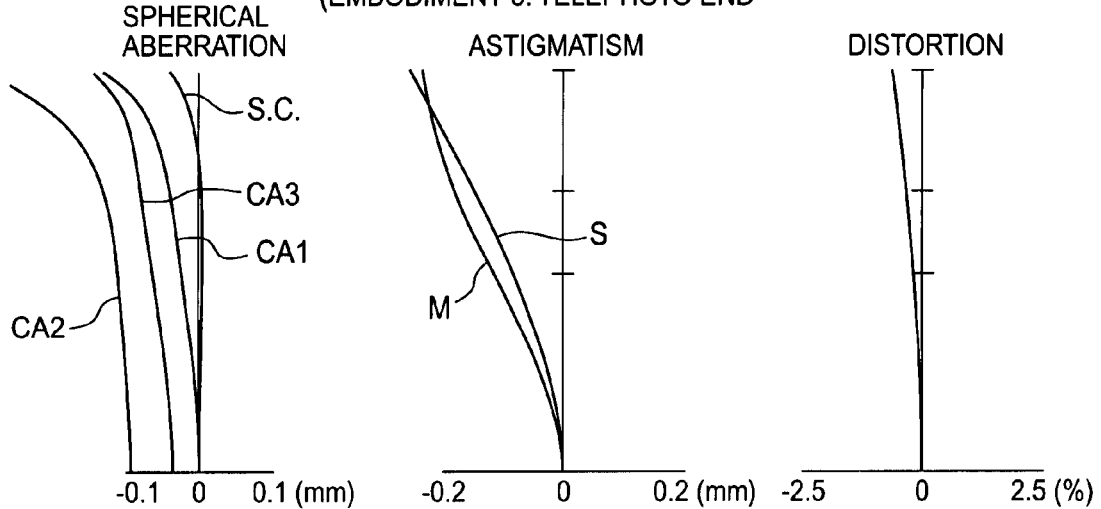

A numerical example for a fifth embodiment of a zoom lens of the invention is shown in Table 5. In addition, FIG. 9 is a drawing showing a lens configuration of the fifth embodiment and FIG. 10 shows drawings illustrating aberrations thereof.

TABLE 5

| | Wide angle end | Intermediate area | Telephoto end |
|---|---|---|---|
| f | 15.87 | 20.08 | 30.60 |
| $F_{no}$ | 2.29 | 2.69 | 3.31 |
| 2ω | 66.14 | 49.31 | 36.51 |
| Hereinafter, airspaces which change by variable power | | | |
| D2 | 1.33 | 6.65 | 4.35 |
| D11 | 7.13 | 4.87 | 3.52 |
| D15 | 23.05 | 11.00 | 0.80 |
| D30 | 34.01 | 42.97 | 56.82 |

TABLE 5-continued

| Serial numbers | Surface numbers | r | d | $n_d$ | $v_d$ |
|---|---|---|---|---|---|
| 1 | 101 | 118.022 | 2.20 | 1.51680 | 64.20 |
| 2 | 102 | ∞ | [D2] | — | — |
| 3 | 211 | 83.614 | 2.00 | 1.80139 | 45.45 |
| 4 | 212 | 15.804 | 5.46 | — | — |
| 5 | 213 | −27.998 | 1.00 | 2.08160 | 30.38 |
| 6 | 214 | 23.484 | 6.48 | 1.71736 | 29.50 |
| 7 | 215 | −16.251 | 0.80 | — | — |
| 8 | 221 | −14.365 | 1.40 | 1.80420 | 46.49 |
| 9 | 222 | −42.434 | 0.21 | — | — |
| 10 | 223 | 155.641 | 3.05 | 1.74950 | 35.04 |
| 11 | 224 | −37.776 | [D11] | — | — |
| 12 | 301 | −16.628 | 1.40 | 1.49700 | 81.61 |
| 13 | 302 | −25.613 | 0.21 | — | — |
| 14 | 303 | ∞ | 2.14 | 1.54814 | 45.82 |
| 15 | 304 | −64.394 | [D15] | — | — |
| 16 | 411 | ∞ | 3.74 | 1.59240 | 68.30 |
| 17 | 412 | −35.189 | 0.20 | — | — |
| 18 | 413 | 34.041 | 6.18 | 1.49700 | 81.61 |
| 19 | 414 | −26.245 | 1.52 | 1.78590 | 43.93 |
| 20 | 415 | −103.019 | 3.53 | — | — |
| 21 | 421 | −35.875 | 1.40 | 1.80420 | 46.49 |
| 22 | 422 | −77.151 | 7.78 | — | — |
| 23 | 431 | −86.757 | 2.63 | 1.68893 | 31.16 |
| 24 | 432 | −30.234 | 4.02 | — | — |
| 25 | 433 | 89.629 | 2.50 | 2.08160 | 30.38 |
| 26 | 434 | 20.319 | 5.04 | 1.49700 | 81.61 |
| 27 | 435 | −79.817 | 0.25 | — | — |
| 28 | 436 | 63.771 | 2.35 | 1.72342 | 37.99 |
| 29 | 437 | ∞ | [D30] | — | — |
| 30 | C01 | ∞ | 3.00 | 1.48745 | 64.84 |
| 31 | C02 | ∞ | — | — | — |

Aspherical coefficient
211th surface

K = −8.94776E+00
A = 3.82802E−05
B = −9.05276E−08
C = 1.04961E−09
D = −5.94446E−12
E = 1.94986E−14

Next, with respect to Embodiments 1 to 5, values corresponding to the conditional expressions (1) to (29) are shown altogether in Table 6.

TABLE 6

| | Embodiment 1 | Embodiment 2 | Embodiment 3 | Embodiment 4 | Embodiment 5 |
|---|---|---|---|---|---|
| Conditional expression (1) | −0.75 | −0.73 | −0.73 | −0.75 | −0.75 |
| Conditional expression (2) | 0.46 | 0.47 | 0.47 | 0.46 | 0.43 |
| Conditional expression (3) | 2.14 | 2.14 | 2.13 | 2.13 | 2.14 |
| Conditional expression (4) | 0.07 | 0.08 | 0.07 | 0.07 | 0.07 |
| Conditional expression (5) | −0.41 | −0.51 | −0.64 | −0.62 | −0.54 |
| Conditional expression (6) | −0.22 | −0.40 | −0.45 | −0.39 | −0.15 |
| Conditional expression (7) | 1.71 | 1.51 | 1.45 | 1.58 | 1.97 |
| Conditional expression (8) | 1.10 | 1.12 | 1.13 | 1.08 | 1.00 |
| Conditional expression (9) | −1.17 | −1.18 | −1.17 | −1.19 | −1.11 |
| Conditional expression (10) | 1.73 | 1.74 | 1.74 | 1.81 | 1.87 |
| Conditional expression (11) | −5.08 | −16.43 | −23.96 | −18.15 | −8.42 |
| Conditional expression (12) | −0.73 | −0.77 | −0.76 | −0.71 | −0.65 |
| Conditional expression (13) | −0.47 | −0.57 | −0.63 | −0.74 | −0.57 |
| Conditional expression (14) | 1.80 | 1.76 | 1.74 | 1.81 | 1.90 |
| Conditional expression (15) | 0.99 | 1.54 | 1.89 | 1.65 | 0.99 |
| Conditional expression (16) | −0.32 | −0.42 | −0.56 | −0.46 | −0.25 |
| Conditional expression (17) | 0.02 | 0.19 | 0.31 | 0.23 | 0.02 |
| Conditional expression (18) | 0.14 | 0.07 | 0.03 | 0.02 | 0.23 |
| Conditional expression (19) | 0.48 | 0.50 | 0.51 | 0.54 | 0.45 |
| Conditional expression (20) | −0.25 | −0.31 | −0.35 | −0.28 | −0.19 |
| Conditional expression (21) | 0.33 | 0.38 | 0.39 | 0.28 | 0.26 |
| Conditional expression (22) | 1.59 | 1.52 | 1.50 | 1.51 | 1.60 |

TABLE 6-continued

|  | Embodiment 1 | Embodiment 2 | Embodiment 3 | Embodiment 4 | Embodiment 5 |
|---|---|---|---|---|---|
| Conditional expression (23) | 0.63 | 0.70 | 0.72 | 0.67 | 0.00 |
| Conditional expression (24) | 71.30 | 76.03 | 81.61 | 76.03 | 74.96 |
| Conditional expression (25) | −0.61 | −0.67 | −0.69 | −0.56 | −0.44 |
| Conditional expression (26) | −0.44 | −0.51 | −0.43 | −0.41 | 0.00 |
| Conditional expression (27) | 22.56 | 26.28 | 29.74 | 27.26 | 19.87 |
| Conditional expression (28) | 0.31 | 0.30 | 0.31 | 0.30 | 0.58 |
| Conditional expression (29) | 48.34 | 46.64 | 35.48 | 46.64 | 51.23 |

As is obvious from Table 6, the numerical values of Embodiments 1 to 5 satisfy the conditional expressions (1) to (29), and as is obvious from the aberration drawings in each embodiment, all the aberrations are corrected properly.

What is claimed is:

1. A zoom lens comprising, in order from a magnifying side thereof, a first lens group having a positive or negative refractive power as a whole, a second lens group having a negative refractive power as a whole, a third lens group having a positive or negative refractive power as a whole and a fourth lens group having a positive refractive power as a whole, wherein changing the magnification of the whole lens system thereof is attained by configuring such that the first lens group is left fixed while a magnification varying operation is effect, the second lens group and the third lens group are made to move on an optical axis in such a manner as to move in a direction from a magnifying side to a contracting side over a range from a wide angle end to an intermediate area and to move in a direction from the contracting side to the magnifying side over a range from the intermediate area to a telephoto end, and the fourth lens group is made to move on the optical axis in such a manner as to move in a direction from the contracting side to the magnifying side over a range from the wide angle end to the telephoto end, and wherein the following conditional expression (1) is satisfied with respect to a power set to the second lens group and the third lens group, the following conditional expression (2) is satisfied with respect to a power set to the fourth lens group, and the following conditional expression (3) is satisfied with respect to the size of an airspace on the contracting side of the fourth lens group at the wide angle end:

$$-1.1 < f_w/f_{II\text{-}III} < -0.6 \quad (1)$$

$$0.35 < f_w/f_{IV} < 0.55 \quad (2)$$

$$1.7 < d_{wIV}/f_w \quad (3)$$

where $f_w$: composite focal length of the whole lens system at the wide angle end
(focused at a magnifying side object distance of 1700 mm from a lens surface of the first lens group which is situated closest to the magnifying side);

$f_{II\text{-}III}$: composite focal length of the second lens group and the third lens group at the wide angle end
(focused at the magnifying side object distance of 1700 mm from the lens surface of the first lens group which is situated closest to the magnifying side);

$f_{IV}$: composite focal length of the fourth lens group;

$d_{wIV}$: airspace between the fourth lens group and a cover glass of a light valve at the wide angle end.

2. A zoom lens as set forth in claim 1, wherein the first lens group is made up by disposing a lens element having a positive refractive power (hereinafter, referred to as a positive lens element) or a lens element having a negative refractive power (hereinafter, referred to as a negative lens element), and wherein the following conditional expression (4) is satisfied with respect to a power set to the first lens group:

$$|f_w/f_I| < 0.3 \quad (4)$$

where, $f_I$: composite focal length of the first lens group.

3. A projector incorporating therein the zoom lens of claim 2.

4. A zoom lens as set forth in claim 1, wherein the second lens group is made up by disposing, in order from a magnifying side thereof, a second a lens group and a second b lens group, the second a lens group being made up by disposing, in order from a magnifying side thereof, a negative lens element which is formed into a meniscus shape which is made to bulge outwards from the magnifying side to be convex, a negative lens element and a positive lens element, the second b lens group having a magnifying side refracting surface which is formed into a heavily concaved surface which bulges inwards towards a contracting side thereof and a contracting side refracting surface which is formed into a convex surface which bulges outwards towards the contracting side and being made up by disposing one or two lens elements, wherein the following conditional expression (5) is satisfied with respect to a power set to the second a lens group, the following conditional expression (6) is satisfied with respect to a power set to the second b lens group, and the following conditional expression (7) is satisfied with respect to a size of the second lens group to the third lens group on the optical axis:

$$-0.9 < f_w/f_{IIa} < -0.3 \quad (5)$$

$$-0.55 < f_w/f_{IIb} < -0.05 \quad (6)$$

$$1.0 < T_{II\text{-}III}/f_w < 2.4 \quad (7)$$

where, $f_{IIa}$: composite focal length of the second a lens group which makes up the second lens group;

$f_{IIb}$: composite focal length of the second b lens group which makes up the second lens group;

$T_{II\text{-}III}$: a distance on the optical axis between the magnifying side surface of the lens element of the second lens group which is disposed closest to the magnifying side and the contracting side surface of the lens element of the third lens group which is disposed closest to the contracting side at the wide angle end
(focused at the magnifying side object distance of 1700 mm from the lens surface of the first lens group which is situated closest to the magnifying side).

5. A zoom lens as set forth in claim 4, wherein the following conditional expression (8) is satisfied with respect to a configuration of a contracting side surface of the magnifying side lens element of the second a lens group, the following conditional expression (9) is satisfied with respect to a configuration of a magnifying side surface of the magnifying side lens element of the second b lens group, the following conditional expression (10) is satisfied with respect to characteristics of the refractive index of a glass material which is used for each of the lens elements which make up the second a lens group, and the following conditional expression (11) is satisfied with respect to the dispersing characteristics of the glass material used for each of the lens elements which make up the second a lens group:

$$0.8 < f_W / r_{IIa2} < 1.4 \quad (8)$$

$$-1.45 < f_W / r_{IIb1} < 0.9 \quad (9)$$

$$1.65 < N_{IIa} \quad (10)$$

$$V_{IIaP} - V_{IIaN} < 0 \quad (11)$$

where, $r_{IIa2}$: radius of curvature of the contracting side surface of the lens element of the second a lens group which is disposed closest to the magnifying side;

$r_{IIb1}$: radius of curvature of the magnifying side surface of the lens element of the second b lens group which is disposed closest to the magnifying side;

$N_{IIa}$: mean value of the refractive indexes of the respective lens elements which make up the second a lens group relative to the d line;

$V_{IIaP}$: mean value of Abbe numbers of the respective positive lens elements which make up the second a lens group;

$V_{IIaN}$: mean value of Abbe numbers of the respective negative lens elements which make up the second a lens group.

6. A projector incorporating therein the zoom lens of claim 5.

7. A zoom lens as set forth in claim 4, wherein a focusing operation is attained by moving the second lens group in the direction of the optical axis, wherein at least one side of the magnifying side lens element of the second a lens group which makes up the second lens group is aspheric, and wherein the following conditional expression (12) is satisfied with respect to a power to be set, the following conditional expression (13) is satisfied with respect to a configuration of a magnifying side surface of the lens element of the second a lens group which is disposed next to the magnifying side lens element thereof, and the following conditional expression (14) is satisfied with respect to the refractive index of a glass material used for the negative lens elements making up the second lens group:

$$-0.9 < f_W / f_{IIa1} < -0.5 \quad (12)$$

$$-0.9 < f_W / r_{IIa3} < -0.35 \quad (13)$$

$$1.65 < (n_{IIa1} + n_{IIa2} + n_{IIb1}) / 3 \quad (14)$$

where, $f_{IIa1}$: focal length of the lens element which makes up the second a lens group and which is disposed closest to the magnifying side;

$r_{IIa3}$: radius of curvature of the magnifying side surface of the lens element which makes up the second a lens group and which is disposed next to the magnifying side lens element thereof;

$n_{IIa1}$: refractive index of the lens element which makes up the second a lens group and which is disposed closest to the magnifying side relative to the line d;

$n_{IIa2}$: refractive index of the lens element which makes up the second a lens group and which is disposed next to the magnifying side lens element thereof relative to the line d;

$n_{IIb1}$: refractive index of the lens element which makes up the second b lens group and which is disposed closest to the magnifying side relative to the line d.

8. A projector incorporating therein the zoom lens of claim 7.

9. A projector incorporating therein the zoom lens of claim 4.

10. A zoom lens as set forth in claim 1, wherein the third lens group is made up of a total of one or two lens elements including at least one positive lens element, and wherein the following conditional expression (15) is satisfied with respect to a power condition which is set to the third lens group in relation to the second lens group and the following conditional expression (16) is satisfied with respect to the configuration of a contracting side surface of the third lens group:

$$0.8 < f_{II-III} / f_{II} < 2.2 \quad (15)$$

$$-0.65 < f_W / r_{IIIL} < -0.1 \quad (16)$$

where, $r_{IIIL}$: radius of curvature of the contracting side surface of the lens element of the third lens group which is disposed closest to the contracting side.

11. A zoom lens as set forth in claim 10, wherein the following conditional expression (17) is satisfied with respect to a power set to the third lens group, and the following conditional expression (18) is satisfied with respect to variation in the airspace between the second lens group and the third lens group relative to a magnification varying operation from the wide angle end to the telephoto end:

$$f_W / |f_{III}| < 0.4 \quad (17)$$

$$|d_{II-III}| / f_W < 0.3 \quad (18)$$

where, $f_{III}$: composite focal length of the third lens group;

$d_{II-III}$: variation in the airspace between the second lens group and the third lens group relative to the magnification varying operation from the wide angle end to the telephoto end (focused at the magnifying side object distance of 1700 mm from the lens surface of the first lens group which is situated closest to the magnifying side).

12. A projector incorporating therein the zoom lens of claim 11.

13. A projector incorporating therein the zoom lens of claim 10.

14. A zoom lens as set forth in claim 1, wherein the fourth lens group is made up by disposing, in order from a magnifying side thereof, a fourth a lens group, a fourth b lens group and a fourth c lens group, the fourth a lens group having a positive refractive power as a whole and being made up by disposing a total of one to three lens elements including at least one positive lens element, the fourth b lens group being made up by disposing one lens element, and the fourth c lens group having a positive refractive power as a whole and being made up by disposing a total of three to four lens elements including at least two positive lens elements and one negative lens element, and wherein the following conditional expression (19), conditional expression (20) and conditional expression (21) are satisfied with respect to powers set to the fourth a lens group, fourth b lens group and fourth c lens group, respectively, and the following conditional expression (22) is satisfied with respect to the characteristics of the refractive index of a glass material used for each of the positive lens elements which make up the fourth lens group:

$$0.35 < f_w/f_{IVa} < 0.65 \quad (19)$$

$$-0.45 < f_w/f_{IVb} < -0.15 \quad (20)$$

$$0.2 < f_w/f_{IVc} < 0.5 \quad (21)$$

$$N_{IVP} < 1.7 \quad (22)$$

where,
- $f_{IVa}$: composite focal length of the fourth a lens group which makes up the fourth lens group;
- $f_{IVb}$: composite focal length of the fourth b lens group which makes up the fourth lens group;
- $f_{IVc}$: composite focal length of the fourth c lens group which makes up the fourth lens group;
- $N_{IVP}$: mean value of refractive indexes of the respective positive lens elements which make up the fourth lens group relative to the line d.

15. A zoom lens as set forth in claim 14, wherein the following conditional expression (23) is satisfied with respect to the configuration of a magnifying side surface of the lens element of the fourth a lens group which is disposed closest to the magnifying side, and the following conditional expression (24) is satisfied with respect to the dispersion characteristics of a glass material which is used for each of the positive lens elements which make up the fourth a lens group:

$$-0.05 < f_w/r_{IVa1} < 0.85 \quad (23)$$

$$55 < V_{IVaP} \quad (24)$$

where,
- $r_{IVa1}$: radius of curvature of the magnifying side surface of the lens element of the fourth a lens group which is disposed closest to the magnifying side;
- $V_{IVaP}$: mean value of Abbe numbers of the respective positive lens element which make up the fourth a lens group.

16. A zoom lens as set forth in claim 14, wherein the following conditional expression (25) is satisfied with respect to the configuration of a magnifying side surface of the fourth b lens group:

$$-0.8 < f_w/r_{IVb1} < -0.35 \quad (25)$$

where,
- $r_{IVb1}$: radius of curvature of the magnifying side surface of the fourth b lens group.

17. A zoom lens as set forth in claim 14, wherein the following conditional expression (26) is satisfied with respect to the configuration of a contracting side surface of a lens element of the fourth c lens group which is disposed closest to the contracting side, and the following conditional expression (27) is satisfied with respect to the dispersion characteristics of a glass material which is used for each of the lens elements which make up the fourth c lens group:

$$-0.6 < f_w/r_{IVcL} < 0.05 \quad (26)$$

$$15 < V_{IVcP} - V_{IVcN} \quad (27)$$

where,
- $r_{IVcL}$: radius of curvature of the contracting side surface of the lens element of the fourth c lens group which is disposed closest to the contracting side;
- $V_{IVcP}$: mean value of Abbe numbers of the respective positive lens elements which make up the fourth c lens group;
- $V_{IVcN}$: mean value of Abbe numbers of the respective negative lens elements which make up the fourth c lens group.

18. A zoom lens as set forth in claim 14, wherein the fourth c lens group is configured to include a partial system constituent element which is made up of at least two lens elements, one negative lens element and one positive lens element, which are cemented together, and wherein the following conditional expression (28) is satisfied with respect to the refractive index of a glass material used for each of the lens elements which are cemented together, and the following conditional expression (29) is satisfied similarly with respect to the dispersion characteristics of the glass material used for each of the lens elements which are cemented together:

$$0.25 < N_{IVcCN} - N_{IVcCP} \quad (28)$$

$$30 < V_{IVcCP} - V_{IVcCN} \quad (29)$$

where,
- $N_{IVcCP}$: mean value of the refractive indexes of the positive lens elements of the fourth c lens group which are disposed in the cemented partial system thereof relative to the line d;
- $N_{IVcCN}$: mean value of the refractive indexes of the negative lens elements of the fourth c lens group which are disposed in the cemented partial system thereof relative to the line d;
- $V_{IVcCP}$: mean value of Abbe numbers of the positive lens elements of the fourth c lens group which are disposed in the cemented partial system thereof;
- $V_{IVcCN}$: mean value of Abbe numbers of the negative lens elements of the fourth c lens group which are disposed in the cemented partial system thereof.

19. A projector incorporating therein the zoom lens of claim 14.

20. A projector incorporating therein the zoom lens of claim 1.

* * * * *